United States Patent
Lim et al.

(10) Patent No.: US 11,889,505 B2
(45) Date of Patent: Jan. 30, 2024

(54) CONFIGURATION OF CONTROL INFORMATION

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 149 days.

(21) Appl. No.: 17/398,486

(22) Filed: Aug. 10, 2021

(65) Prior Publication Data

US 2022/0053475 A1    Feb. 17, 2022

(51) Int. Cl.
*H04W 72/04* (2023.01)
*H04W 72/20* (2023.01)
*H04L 41/0803* (2022.01)
*H04W 80/02* (2009.01)
*H04W 84/12* (2009.01)

(52) U.S. Cl.
CPC ......... *H04W 72/20* (2023.01); *H04L 41/0803* (2013.01); *H04W 80/02* (2013.01); *H04W 84/12* (2013.01)

(58) Field of Classification Search
CPC ..... H04W 72/20; H04W 80/02; H04W 84/12; H04L 41/0803
See application file for complete search history.

(56) References Cited

U.S. PATENT DOCUMENTS

| | | | |
|---|---|---|---|
| 2018/0205520 A1* | 7/2018 | Lin | H04L 5/00 |
| 2019/0045461 A1* | 2/2019 | Fang | H04W 52/245 |
| 2019/0069298 A1* | 2/2019 | Chen | H04W 72/0453 |
| 2019/0097850 A1* | 3/2019 | Kenney | H04L 5/0044 |
| 2019/0380117 A1* | 12/2019 | Verma | H04L 5/0007 |
| 2020/0112408 A1* | 4/2020 | Verma | H04B 7/0452 |
| 2021/0044398 A1* | 2/2021 | Noh | H04L 1/0041 |
| 2021/0045151 A1* | 2/2021 | Chen | H04W 74/002 |
| 2021/0135792 A1* | 5/2021 | Cho | H04L 1/1887 |
| 2021/0258407 A1* | 8/2021 | Lim | H04L 27/2603 |
| 2021/0378054 A1* | 12/2021 | Belur Ramachandra | H04W 72/541 |
| 2022/0255693 A1* | 8/2022 | Lou | H04L 27/2613 |

* cited by examiner

*Primary Examiner* — Fahmida S Chowdhury
(74) *Attorney, Agent, or Firm* — BRYAN CAVE LEIGHTON PAISNER LLP

(57) ABSTRACT

The present specification proposes technical features for improving various fields included in a PPDU. For example, a control signal field included in the PPDU may include a plurality of content channels and may be transmitted through a plurality of frequency segments. The plurality of content channels may include actual allocation information regarding a resource unit allocated to a specific frequency segment. Further, it may include preset information, not actual allocation information, regarding a resource unit allocated to another frequency segment. The preset information may be variously configured, for example, may be embodied as a zero user field.

16 Claims, 24 Drawing Sheets

FIG. 1
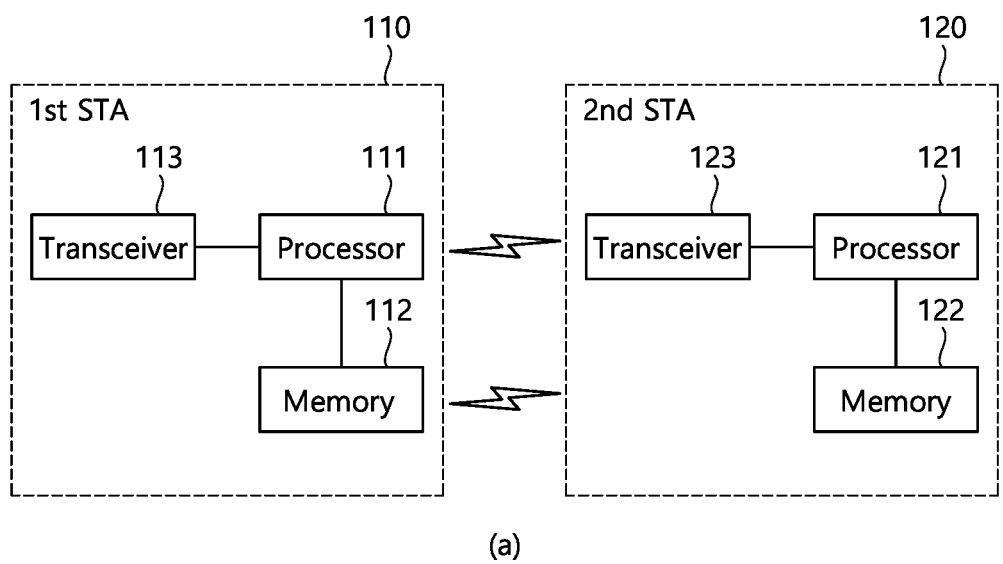
(a)
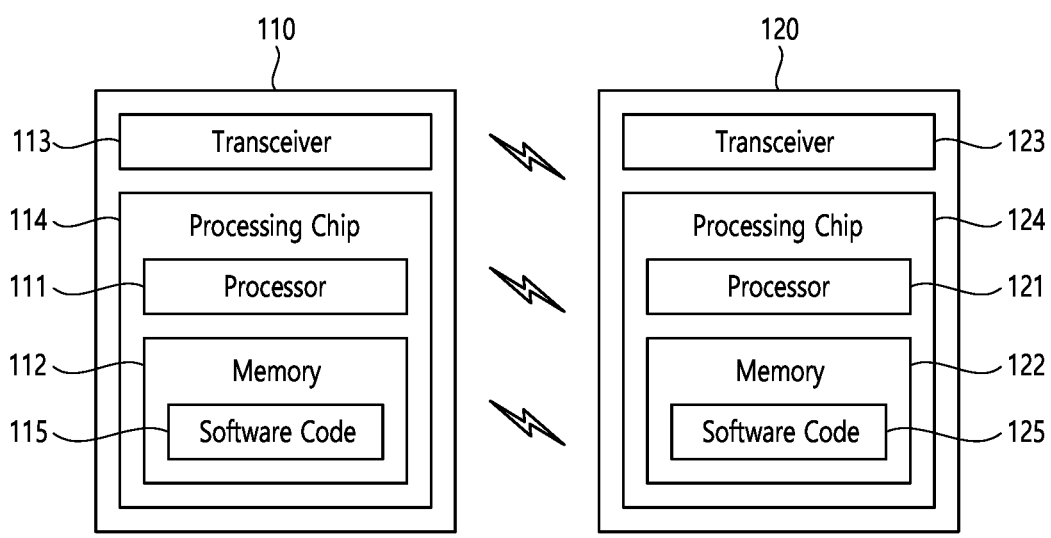
(b)

FIG. 2
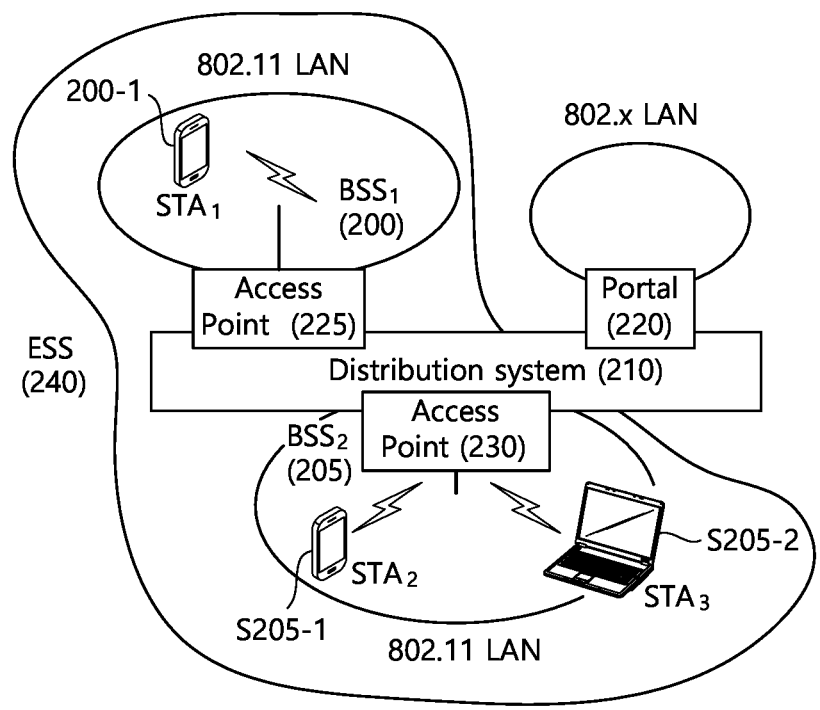
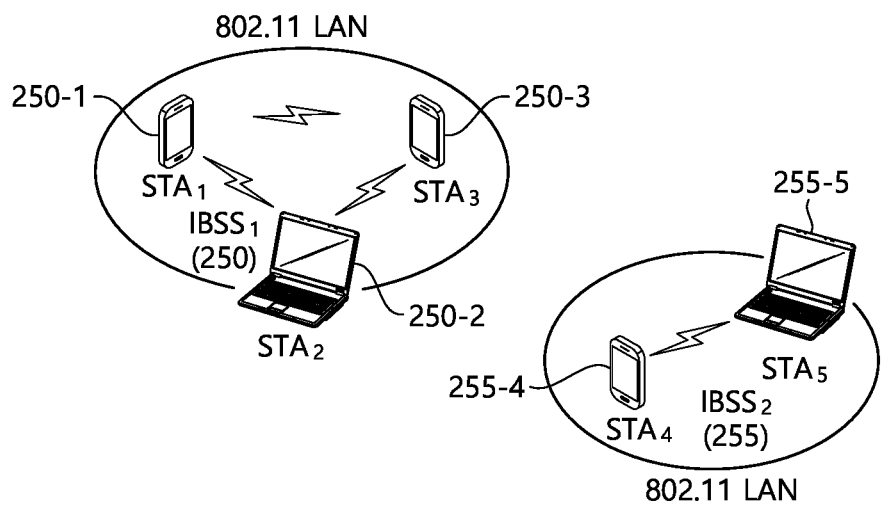

FIG. 3
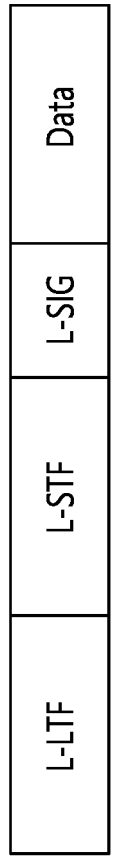
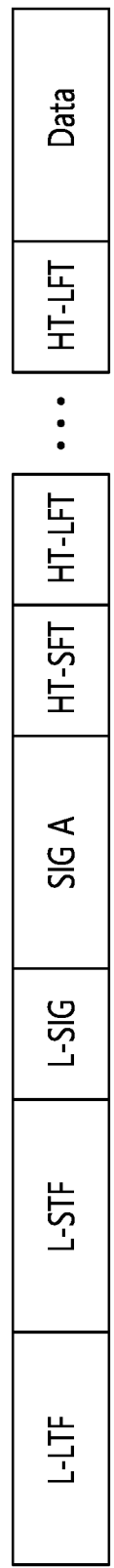
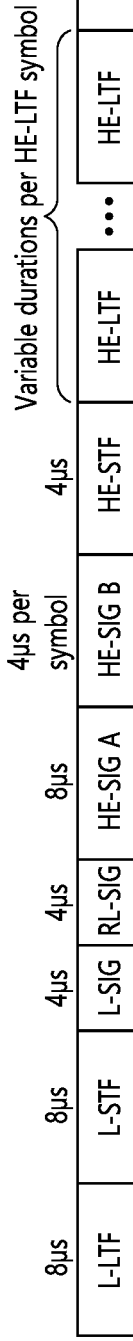

| Version independent field (1710) | Version dependent field (1720) |

CONFIGURATION OF CONTROL INFORMATION

CROSS-REFERENCE TO RELATED APPLICATION

Pursuant to 35 U.S.C. § 119 (a), this application claims the benefit of Korean Patent Application No. 10-2020-0100693 filed on Aug. 11, 2020, the contents of which are all hereby incorporated by reference herein in their entirety.

BACKGROUND

Technical Field

The present specification relates to a wireless LAN system, and more specifically, to the configuration of control information used in the wireless LAN system.

Description of the Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In order to support a high throughput and a high data rate, the EHT standard may use a wide bandwidth (e.g., 160/320 MHz), 16 streams, and/or a multi-link (or multi-band) operation or the like.

In the EHT standard, a wide bandwidth (e.g., 160/240/320 MHz) may be used for high throughput. Also, in order to efficiently use bandwidth, preamble puncturing and multiple RU transmission may be used.

SUMMARY

The EHT-SIG may include decoding information for a data field transmitted through at least one RU indicated by an RU allocation subfield.

The next-generation wireless LAN standard can support wide bandwidths such as 160 MHz and 320 MHz. In this case, there may be a problem in that the amount of the decoding information included in the EHT-SIG increases.

The present specification proposes various technical features that can be applied to the PPDU. For example, the present specification may relate to the configuration of control information that can reduce the amount of the decoding information. For example, the control information may be included in a control channel (e.g., EHT-SIG Content Channel) including allocation information (or location information) related to at least one RU.

A transmitting/receiving station (STA) using a PPDU according to an example of the present specification may support efficient communication in an encoding and/or decoding process. For example, the amount of encoding information and/or decoding information related to the PPDU of the present specification may be reduced. For example, when the PPDU is transmitted through a frequency band greater than 80 MHz, the bit size of the information field included in the control channel may be reduced.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 3 illustrates an example of a PPDU used in an IEEE standard.

FIG. 17 shows an example of a first control signal field or U-SIG field of the present specification.

DESCRIPTION OF EXEMPLARY EMBODIMENTS

Figure 4:
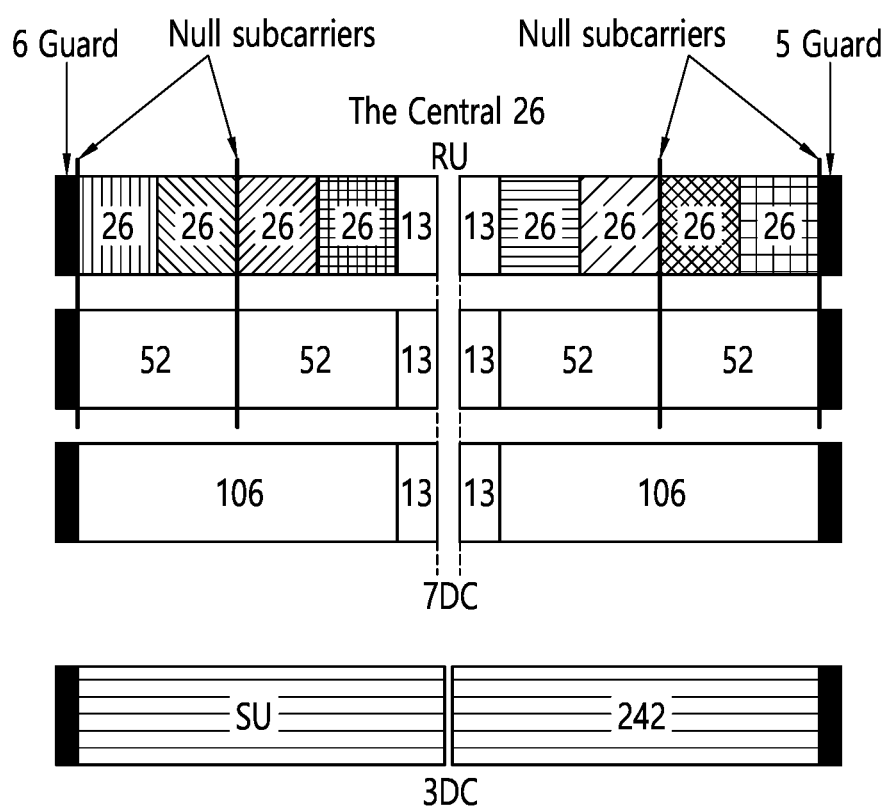
FIG. 4 illustrates a layout of resource units (RUs) used in a band of 20 MHz.

In the present specification, "A or B" may mean "only A", "only B" or "both A and B". In other words, in the present specification, "A or B" may be interpreted as "A and/or B".

For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3$^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a subfield (SIG, STF, LTF, Data) included in a PPDU; 2) an operation of determining/configuring/obtaining a time resource or frequency resource (e.g., a subcarrier resource) or the like used for the subfield (SIG, STF, LTF, Data) included the PPDU; 3) an operation of determining/configuring/obtaining a specific sequence (e.g., a pilot sequence, an STF/LTF sequence, an extra sequence applied to SIG) or the like used for the subfield (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e., IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e., IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 3 also includes an example of an HE PPDU according to IEEE 802.11ax. The HE PPDU according to FIG. 3 is an illustrative PPDU for multiple users. An HE-SIG-B may be included only in a PPDU for multiple users, and an HE-SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

FIG. 4 illustrates a layout of resource units (RUs) used in a band of 20 MHz.

As illustrated in FIG. 4, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 4, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 4 may be used not only for a multiple users (MUs) but also for a single user (SU), in which case one 242-unit may be used and three DC tones may be inserted as illustrated in the lowermost part of FIG. 4.

Although FIG. 4 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 5:
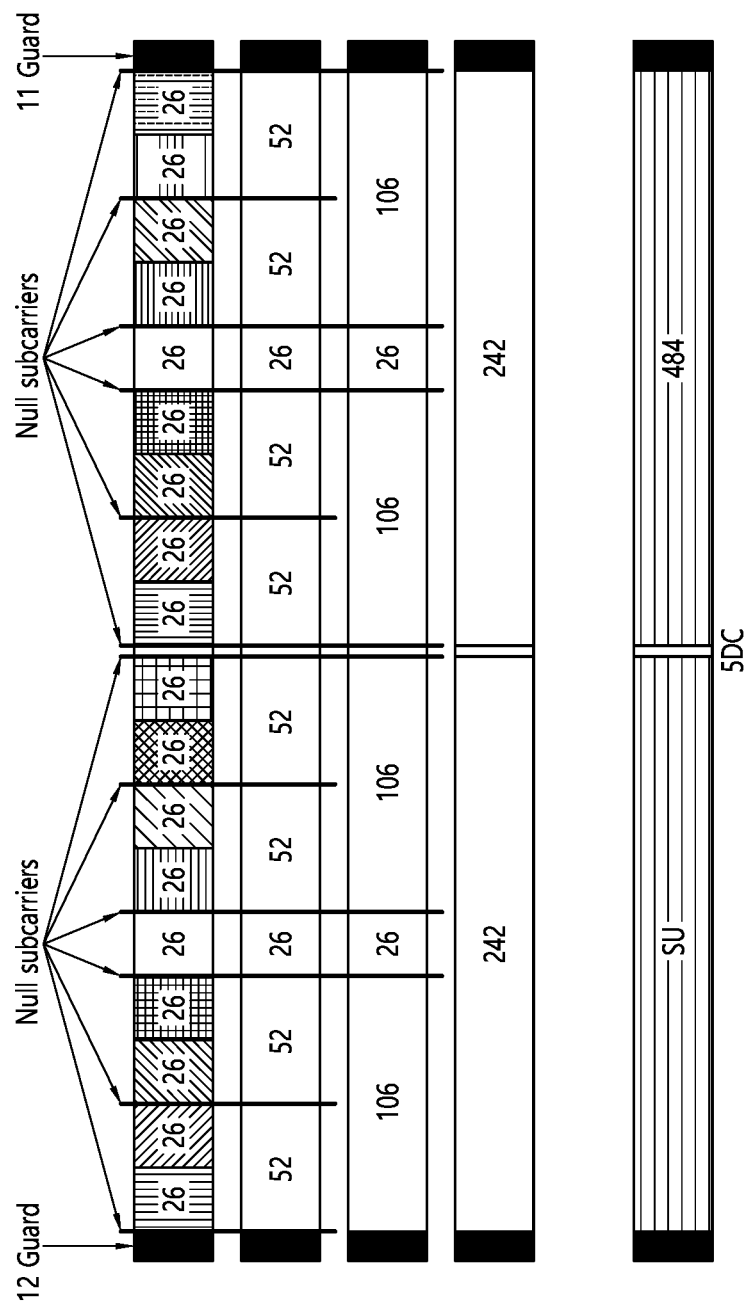
FIG. 5 illustrates a layout of RUs used in a band of 40 MHz.

FIG. 5 illustrates a layout of RUs used in a band of 40 MHz.

Similarly to FIG. 4 in which RUs having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

As illustrated, when the layout of the RUs is used for a single user, a 484-RU may be used. The specific number of RUs may be changed similarly to FIG. 5.

Figure 6:
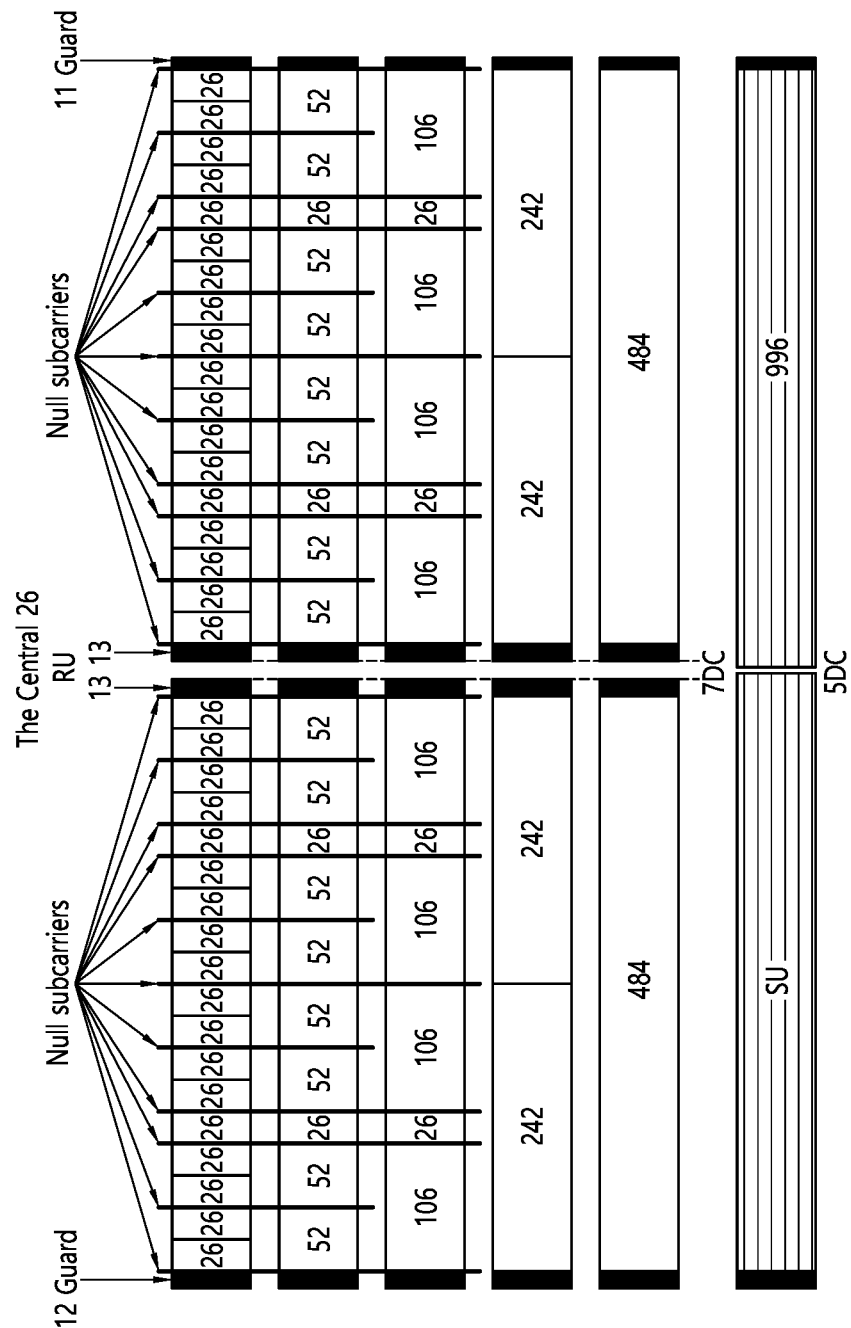
FIG. 6 illustrates a layout of RUs used in a band of 80 MHz.

FIG. 6 illustrates a layout of RUs used in a band of 80 MHz.

Similarly to FIG. 4 and FIG. 5 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 7:
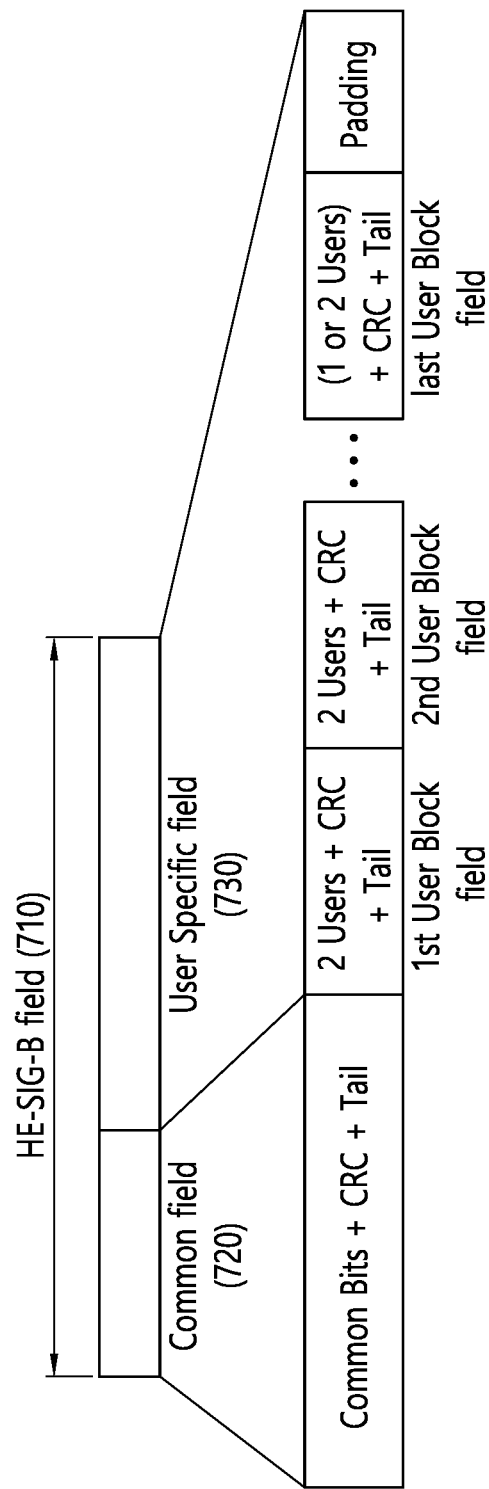
FIG. 7 illustrates a structure of an HE-SIG-B field.

FIG. 7 illustrates a structure of an HE-SIG-B field.

As illustrated, an HE-SIG-B field 710 includes a common field 720 and a user specific field 730. The common field 720 may include information commonly applied to all users (i.e., user STAs) which receive SIG-B. The user specific field 730 may be called a user specific control field. When the SIG-B is transferred to a plurality of users, the user specific field 730 may be applied only any one of the plurality of users.

As illustrated in FIG. 7, the common field 720 and the user specific field 730 may be separately encoded.

The common field 720 may include RU allocation information of N*8 bits. For example, the RU allocation information may include information related to a location of an RU. For example, when a 20 MHz channel is used as shown in FIG. 4, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |  | 1 |
| 00000010 | 26 | 26 | 26 | 20 | 26 | 52 | 26 | 26 |  | 1 |
| 00000011 | 26 | 26 | 26 | 26 | 52 | 52 |  |  |  | 1 |
| 00000100 | 26 | 26 | 52 | 26 | 26 | 26 | 26 |  |  | 1 |
| 00000101 | 26 | 26 | 52 | 26 | 26 | 26 | 52 |  |  | 1 |
| 00000110 | 26 | 26 | 52 | 26 | 52 | 26 | 26 |  |  | 1 |
| 00000111 | 26 | 26 | 52 | 26 | 52 | 52 |  |  |  | 1 |
| 00001000 | 52 | 26 | 26 | 26 | 26 | 26 | 26 | 26 |  | 1 |

As shown the example of FIG. 4, up to nine 26-RUs may be allocated to the 20 MHz channel. When the RU allocation information of the common field 720 is set to 00000000 as shown in Table 1, the nine 26-RUs may be allocated to a corresponding channel (i.e., 20 MHz). In addition, when the RU allocation information of the common field 720 is set to "00000001" as shown in Table 1, seven 26-RUs and one 52-RU are arranged in a corresponding channel. That is, in the example of FIG. 4, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ |  | 106 |  | 26 | 26 | 26 | 26 | 26 |  | 8 |
| 01001$y_2y_1y_0$ |  | 106 |  | 26 | 26 | 26 | 52 |  |  | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 7, the user specific field 730 may include a plurality of user fields. As described above, the number of STAs (e.g., user STAs) allocated to a specific channel may be determined based on the RU allocation information of the common field 720. For example, when the RU allocation information of the common field 720 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 8.

Figure 8:
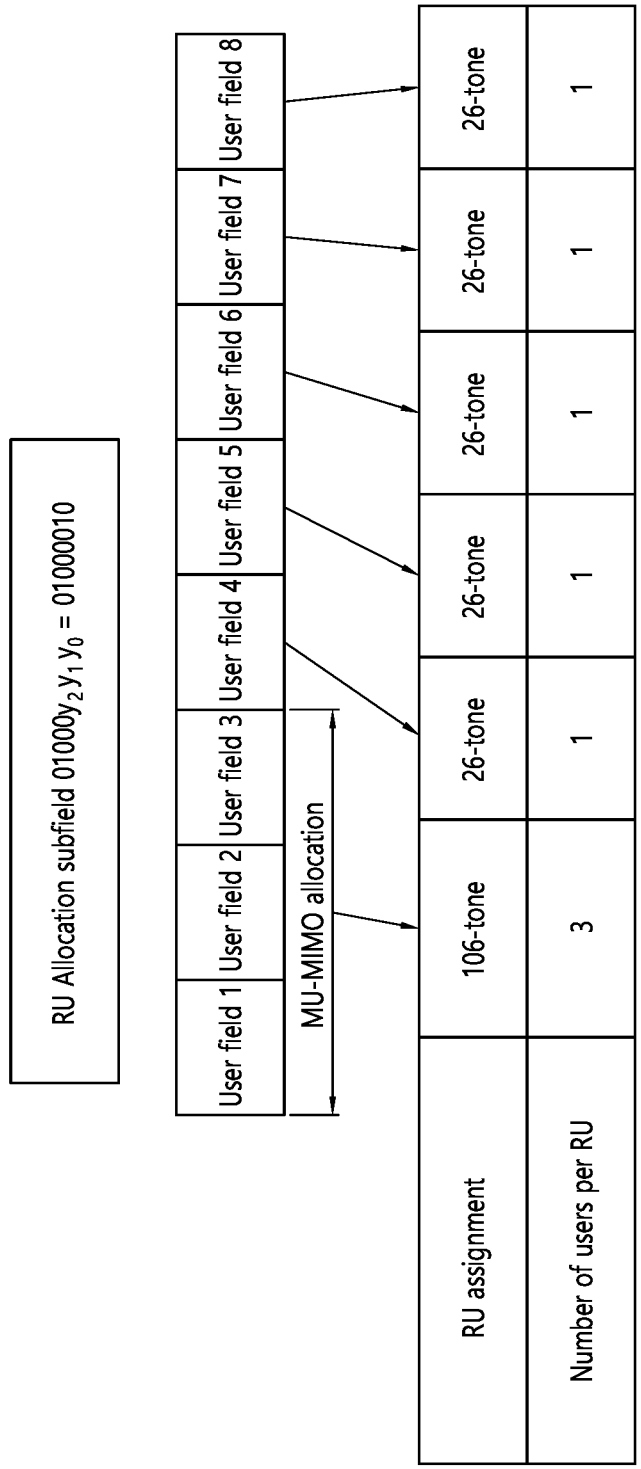
FIG. 8 illustrates an example in which a plurality of user STAs are allocated to the same RU through a MU-MIMO scheme.

FIG. 8 illustrates an example in which a plurality of user STAs are allocated to the same RU through a MU-MIMO scheme.

For example, when RU allocation is set to "01000010" as shown in FIG. 7, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user specific field 730 of HE-SIG-B may include eight user fields.

The eight user fields may be expressed in the order shown in FIG. 8. In addition, as shown in FIG. 7, two user fields may be implemented with one user block field.

The user fields shown in FIG. 7 and FIG. 8 may be configured based on two formats. That is, a user field related to a MU-MIMO scheme may be configured in a first format, and a user field related to a non-MIMO scheme may be configured in a second format. Referring to the example of FIG. 8, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 8, N user is set to "3". Therefore, values of N_STS[1], N_STS1[2], and N_STS[13] may be determined as shown in Table 3. For example, when a value of the second bit (B11-B14) is "0011", it may be set to N_STS[1]=4, N_STS[2]=1, N_STS [3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 9:
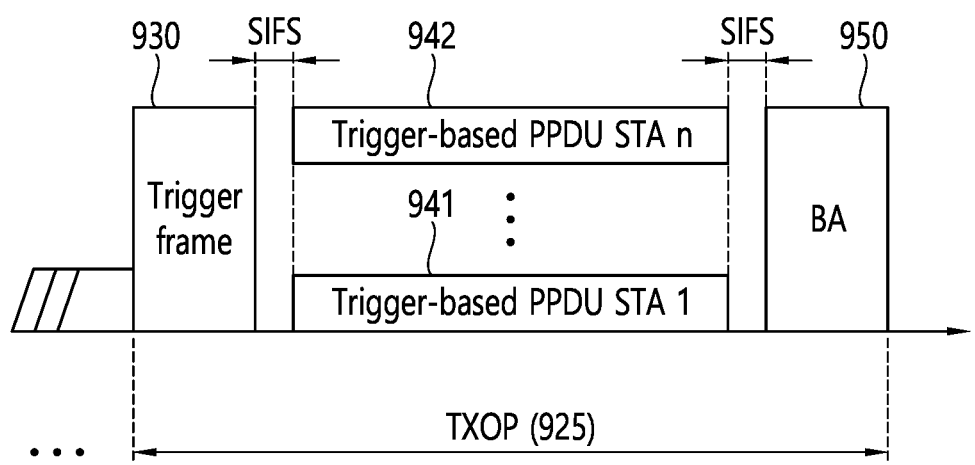
FIG. 9 illustrates an operation based on UL-MU.

FIG. 9 illustrates an operation based on UL-MU. As illustrated, a transmitting STA (e.g., an AP) may perform channel access through contending (e.g., a backoff operation), and may transmit a trigger frame 930. That is, the transmitting STA may transmit a PPDU including the trigger frame 930. Upon receiving the PPDU including the trigger frame, a trigger-based (TB) PPDU is transmitted after a delay corresponding to SIFS.

TB PPDUs 941 and 942 may be transmitted at the same time period, and may be transmitted from a plurality of STAs (e.g., user STAs) having AIDs indicated in the trigger frame 930. An ACK frame 950 for the TB PPDU may be implemented in various forms.

Figure 10:
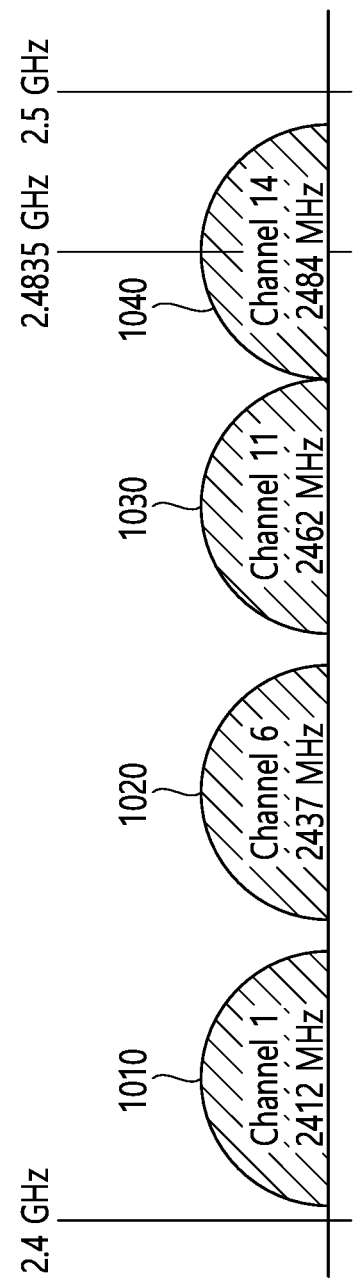
FIG. 10 illustrates an example of a channel used/supported/defined within a 2.4 GHz band.

FIG. 10 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 10 exemplifies 4 channels within a 2.4 GHz band. Each of 1st to 4th frequency domains 1010 to 1040 shown herein may include one channel. For example, the 1st frequency domain 1010 may include a channel 1 (a 20 MHz channel having an index 1). In this case, a center frequency of the channel 1 may be set to 2412 MHz. The 2nd frequency domain 1020 may include a channel 6. In this case, a center frequency of the channel 6 may be set to 2437 MHz. The 3rd frequency domain 1030 may include a channel 11. In this case, a center frequency of the channel 11 may be set to 2462 MHz. The 4th frequency domain 1040 may include a channel 14. In this case, a center frequency of the channel 14 may be set to 2484 MHz.

Figure 11:
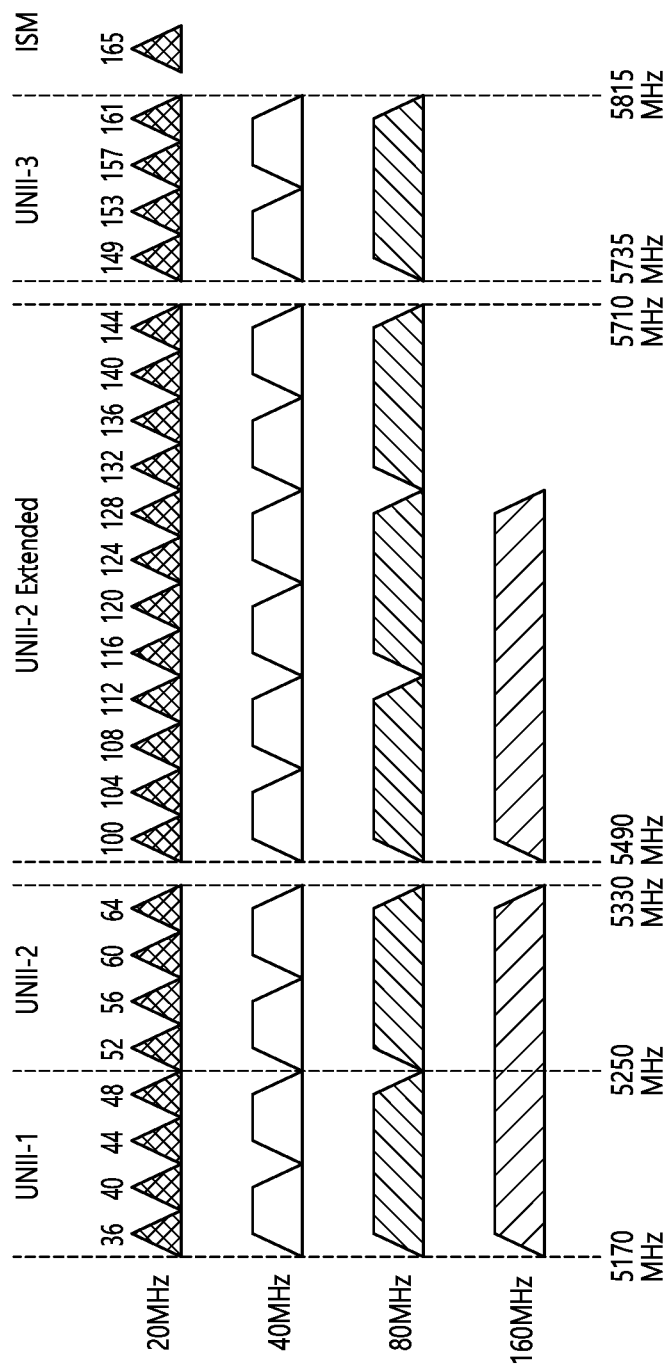
FIG. 11 illustrates an example of a channel used/supported/defined within a 5 GHz band.

FIG. 11 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 11 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 12:
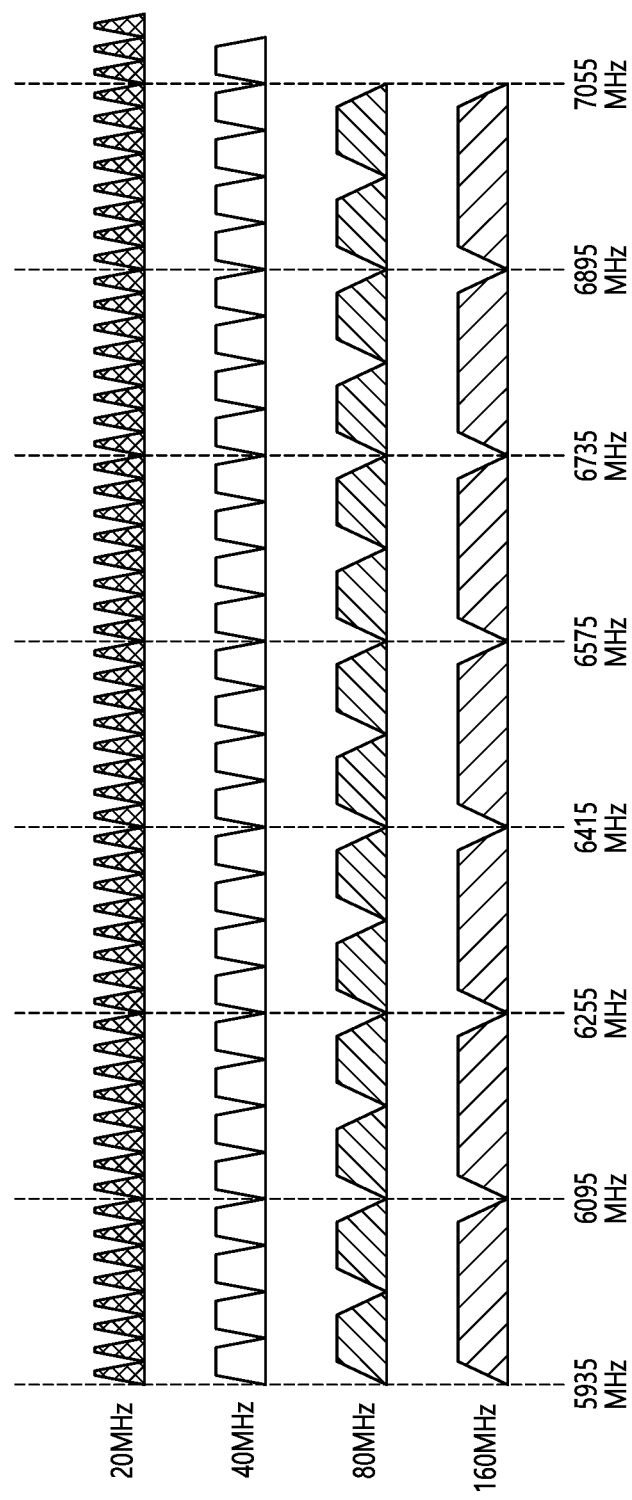
FIG. 12 illustrates an example of a channel used/supported/defined within a 6 GHz band.

FIG. 12 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 12 may be changed.

For example, the 20 MHz channel of FIG. 12 may be defined starting from 5.940 GHz. Specifically, among 20 MHz channels of FIG. 12, the leftmost channel may have an index 1 (or a channel index, a channel number, etc.), and 5.945 GHz may be assigned as a center frequency. That is, a center frequency of a channel of an index N may be determined as $(5.940+0.005*N)$ GHz.

Accordingly, an index (or channel number) of the 2 MHz channel of FIG. 12 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned $(5.940+0.005*N)$ GHz rule, an index of the 40 MHz channel of FIG. 12 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 2, a 240 MHz channel or a 320 MHz channel may be additionally added.

Hereinafter, a PPDU transmitted/received in a STA of the present specification will be described.

Figure 13:
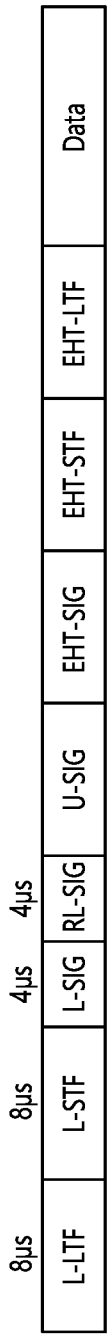
FIG. 13 illustrates an example of a PPDU used in the present specification.

FIG. 13 illustrates an example of a PPDU used in the present specification.

The PPDU of FIG. 13 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

Figure 14:
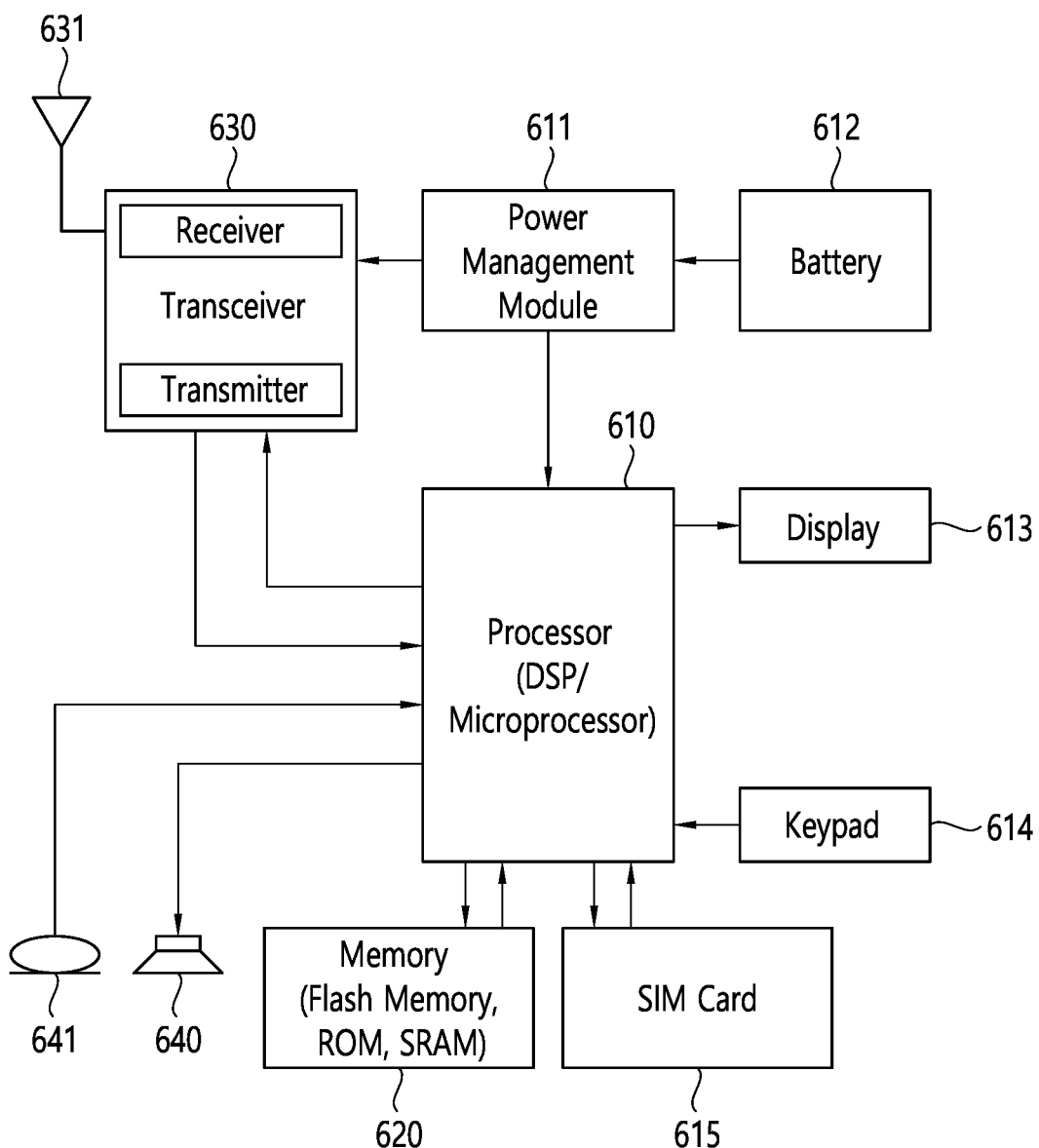
FIG. 14 illustrates an example of a modified transmission device and/or receiving device of the present specification.

The PPDU of FIG. 13 may indicate the entirety or part of a PPDU type used in the EHT system. For example, the example of FIG. 13 may be used for both of a single-user (SU) mode and a multi-user (MU) mode. In other words, the PPDU of FIG. 13 may be a PPDU for one receiving STA or a plurality of receiving STAs. When the PPDU of FIG. 14 is used for a trigger-based (TB) mode, the EHT-SIG of FIG. 13 may be omitted. In other words, an STA which has received a trigger frame for uplink-MU (UL-MU) may transmit the PPDU in which the EHT-SIG is omitted in the example of FIG. 13.

In FIG. 13, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 13 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 13, the L-LTF and the L-STF may be the same as those in the conventional fields.

The L-SIG field of FIG. 13 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 13. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of $R=1/2$ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, '000000'.

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 14. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 13 may include control information for the receiving STA. The EHT-SIG may be transmitted through at least one symbol, and one symbol may have a length of 4 μs. Information related to the number of symbols used for the EHT-SIG may be included in the U-SIG.

The EHT-SIG may include a technical feature of the HE-SIG-B described with reference to FIG. 7 and FIG. 8. For example, the EHT-SIG may include a common field and a user specific field as in the example of FIG. 7. The common field of the EHT-SIG may be omitted, and the number of user specific fields may be determined based on the number of users.

As in the example of FIG. 7, the common field of the EHT-SIG and the user specific field of the EHT-SIG may be individually coded. One user block field included in the user specific field may include information for two users, but a last user block field included in the user specific field may include information for one user. That is, one user block field of the EHT-SIG may include up to two user fields. As in the example of FIG. 8, each user field may be related to MU-MIMO allocation, or may be related to non-MU-MIMO allocation.

As in the example of FIG. 7, the common field of the EHT-SIG may include a CRC bit and a tail bit. A length of the CRC bit may be determined as 4 bits. A length of the tail bit may be determined as 6 bits, and may be set to '000000'.

As in the example of FIG. 7, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1. The example of Table 5 to Table 7 is an example of 8-bit (or N-bit) information for various RU allocations. An index shown in each table may be modified, and some entries in Table 5 to Table 7 may be omitted, and entries (not shown) may be added.

TABLE 5

| Indices | #1 | #2 | #3 | #4 | #5 | #6 | #7 | #8 | #9 | Number of entries |
|---------|----|----|----|----|----|----|----|----|----|-------------------|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 26 | 26 | 26 | 26 | 26 | | 106 | | | 1 |

TABLE 5-continued

| Indices | #1 | #2 | #3 | #4 | #5 | #6 | #7 | #8 | #9 | Number of entries |
|---------|----|----|----|----|----|----|----|----|----|-------------------|
| 17 | 26 | 26 | | 52 | | 26 | | 106 | | 1 |
| 18 | 52 | | 26 | 26 | 26 | | 106 | | | 1 |
| 19 | 52 | | 52 | | 26 | | 106 | | | 1 |

TABLE 6

| Indices | #1 | #2 | #3 | #4 | #5 | #6 | #7 | #8 | #9 | Number of entries |
|---------|----|----|----|----|----|----|----|----|----|-------------------|
| 20 | | | 106 | | 26 | 26 | 26 | 26 | 26 | 1 |
| 21 | | | 106 | | 26 | 26 | 26 | 52 | | 1 |
| 22 | | | 106 | | 26 | 52 | | 26 | 26 | 1 |
| 23 | | | 106 | | 26 | 52 | | 52 | | 1 |
| 24 | | 52 | | 52 | — | 52 | | 52 | | 1 |
| 25 | | | 242-tone RU empty (with zero users) | | | | | | | 1 |
| 26 | | | 106 | | 26 | | 106 | | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2*996 | | | | | 8 |
| 59 | 26 | 26 | 26 | 26 | 26 | | 52 + 26 | | 26 | 1 |
| 60 | 26 | | 26 + 52 | | 26 | 26 | 26 | 26 | 26 | 1 |
| 61 | 26 | | 26 + 52 | | 26 | 26 | 26 | 52 | | 1 |
| 62 | 26 | | 26 + 52 | | 26 | 52 | | 26 | 26 | 1 |
| 63 | 26 | 26 | | 52 | | 26 | 52 + 26 | | 26 | 1 |
| 64 | 26 | | 26 + 52 | | 26 | 52 + 26 | | 26 | | 1 |
| 65 | 26 | | 26 + 52 | | 26 | 52 | | 52 | | 1 |

TABLE 7

| 66 | 52 | | 26 | 26 | 26 | | 52 + 26 | | 26 | 1 |
|----|----|----|----|----|----|----|---------|----|----|----|
| 67 | 52 | | | 52 | | 26 | 52 + 26 | | 26 | 1 |
| 68 | 52 | | | 52 + 26 | | | 52 | | 52 | 1 |
| 69 | 26 | 26 | 26 | 26 | | | 26 + 106 | | | 1 |
| 70 | 26 | | 26 + 52 | | 26 | | 106 | | | 1 |
| 71 | 26 | 26 | | 52 | | | 26 + 106 | | | 1 |
| 72 | 26 | | 26 + 52 | | | | 26 + 106 | | | 1 |
| 73 | 52 | | 26 | 26 | | | 26 + 106 | | | 1 |
| 74 | 52 | | | 52 | | | 26 + 106 | | | 1 |
| 75 | | | 106 + 26 | | | 26 | 26 | 26 | 26 | 1 |
| 76 | | | 106 + 26 | | | 26 | 26 | 52 | | 1 |
| 77 | | | 106 + 26 | | | 52 | | 26 | 26 | 1 |
| 78 | | | 106 | | 26 | | 52 + 26 | | 26 | 1 |
| 79 | | | 106 + 26 | | | | 52 + 26 | | 26 | 1 |
| 80 | | | 106 + 26 | | | | 52 | | 52 | 1 |
| 81 | | | 106 + 26 | | | | | 106 | | 1 |
| 82 | | | 106 | | | | 26 + 106 | | | 1 |

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU)

received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG.

An HE-STF of FIG. 13 may be used for improving automatic gain control estimation in a multiple input multiple output (MIMO) environment or an OFDMA environment. An HE-LTF of FIG. 13 may be used for estimating a channel in the MIMO environment or the OFDMA environment.

A PPDU (e.g., EHT-PPDU) of FIG. 13 may be configured based on the example of FIG. 4 and FIG. 5.

For example, an EHT PPDU transmitted on a 20 MHz band, i.e., a 20 MHz EHT PPDU, may be configured based on the RU of FIG. 4. That is, a location of an RU of EHT-STF, EHT-LTF, and data fields included in the EHT PPDU may be determined as shown in FIG. 4.

An EHT PPDU transmitted on a 40 MHz band, i.e., a 40 MHz EHT PPDU, may be configured based on the RU of FIG. 5. That is, a location of an RU of EHT-STF, EHT-LTF, and data fields included in the EHT PPDU may be determined as shown in FIG. 5.

Since the RU location of FIG. 5 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 6 but the RU of FIG. 5 is repeated twice.

When the pattern of FIG. 5 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 5 is repeated several times.

The PPDU of FIG. 13 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 13. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2."

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0," the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 13. The PPDU of FIG. 13 may be used to transmit/receive frames of various types. For example, the PPDU of FIG. 13 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 14 may be used for a management frame. An example of the management frame may include a beacon frame, a (re-)association request frame, a (re-)association response frame, a probe request frame, and a probe response frame. For example, the PPDU of FIG. 13 may be used for a data frame. For example, the PPDU of FIG. 13 may be used to simultaneously transmit at least two or more of the control frame, the management frame, and the data frame.

FIG. 14 illustrates an example of a modified transmission device and/or receiving device of the present specification.

Figure 15:
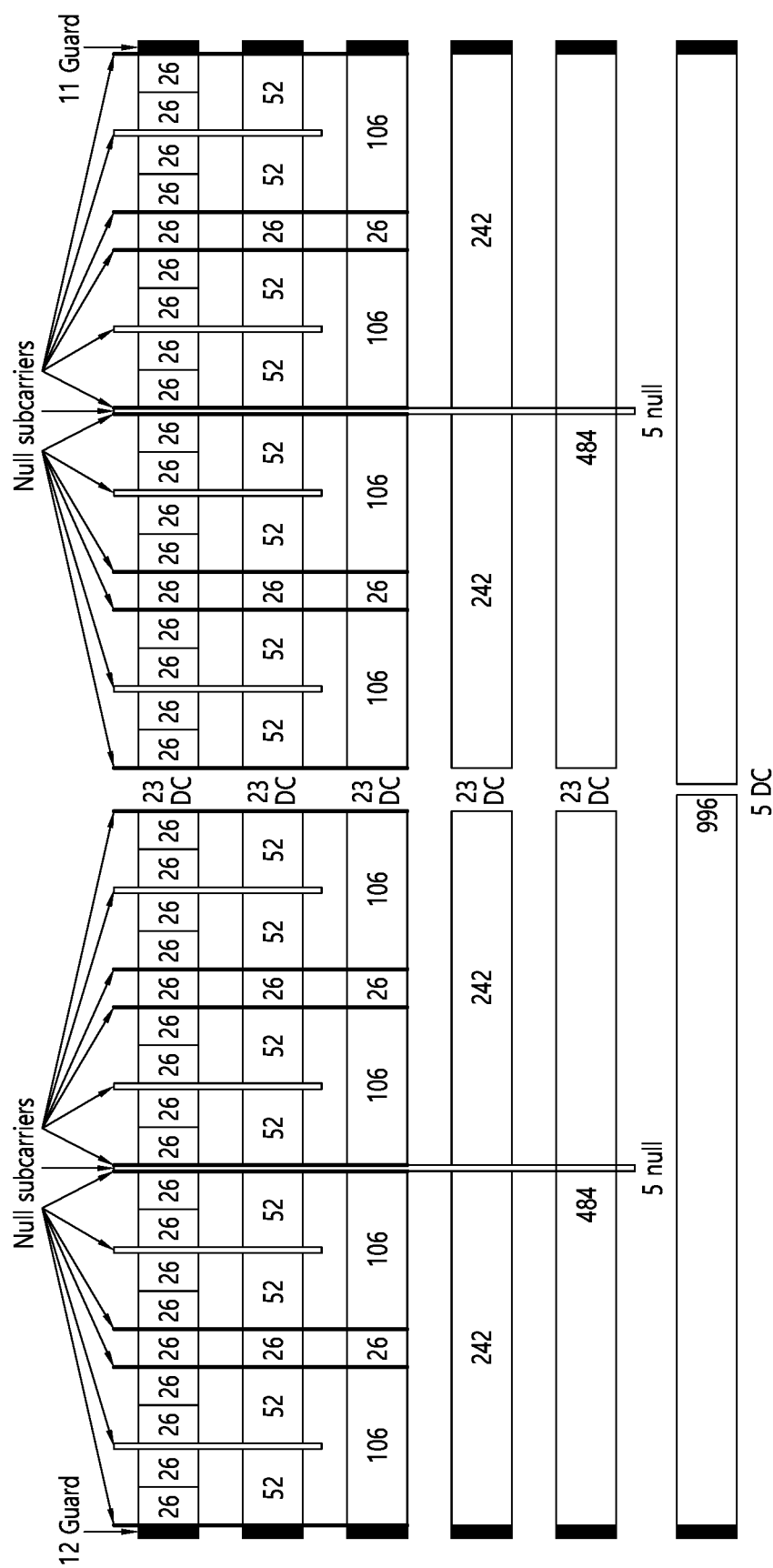
FIG. 15 is a diagram illustrating an arrangement of resource units (RUs) used on an 80 MHz band.

Each device/STA of the sub-figure (a)/(b) of FIG. 1 may be modified as shown in FIG. 15. A transceiver 630 of FIG. 14 may be identical to the transceivers 113 and 123 of FIG. 1. The transceiver 630 of FIG. 14 may include a receiver and a transmitter.

A processor 610 of FIG. 14 may be identical to the processors 111 and 121 of FIG. 1. Alternatively, the processor 610 of FIG. 14 may be identical to the processing chips 114 and 124 of FIG. 1.

A memory 620 of FIG. 14 may be identical to the memories 112 and 122 of FIG. 1. Alternatively, the memory 620 of FIG. 14 may be a separate external memory different from the memories 112 and 122 of FIG. 1.

Referring to FIG. 14, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 14, a speaker 640 may output a result related to a sound processed by the processor 610. A microphone 641 may receive an input related to a sound to be used by the processor 610.

Hereinafter, technical features applicable to the EHT standard may be described.

According to an embodiment, the EHT standard may support a PPDU having a 320 MHz bandwidth. Also, the EHT standard may support 240 MHz and 160+80 MHz transmission. The 240 MHz and 160+80 MHz transmission may be supported by applying a preamble puncturing of 80 MHz to a 320 MHz band. For example, the 240 MHz and 160+80 MHz bandwidths may be configured based on three 80 MHz channels including a primary 80 MHz channel.

According to an embodiment, the EHT standard may provide an 11ax standard tone plan for a 20/40/80/160 MHz PPDU. According to an embodiment, a 160 MHz OFDMA tone plan of the 11ax standard may be duplicated and used for a 320 MHz PPDU.

According to an embodiment, the 240 MHz and 160+80 MHz transmission may consist of three 80 MHz segments. According to an embodiment, a 160 MHz tone plan may be duplicated and used for a non-OFDMA tone plan of a 320 MHz PPDU.

According to an embodiment, 12 and 11 null tones in each 160 MHz segment for the non-OFDMA tone plan of the 320 MHz PPDU may be configured on the leftmost and rightmost sides, respectively.

The above-described technical characteristics may be variously changed. For example, the arrangement of resource units (RUs) used on the 80 MHz band may be variously changed.

FIG. 15 is a diagram illustrating an arrangement of resource units (RUs) used on an 80 MHz band. For example, when an 80 MHz PPDU is used, the LTF, STF, and data fields may be configured according to the example of FIG. 15. For example, the arrangement of the resource unit for the 160 MHz PPDU (or band) may be in a form in which the arrangement of FIG. 15 is repeated. That is, the positions of the RUs allocated to each of the lower 80 MHz band and the upper 80 MHz band of the 160 MHz band (or 80+80 MHz band) may be the same as the positions of the RUs shown in FIG. 15. For example, the arrangement of the resource unit for the 320 MHz PPDU (or band) may be in a form in which the arrangement of FIG. 15 is repeated. That is, the arrangement of the four 80 MHz resource units constituting the 320 MHz band (or the 160+160 MHz band) may be the same as the arrangement of the resource units shown in FIG. 15. In the following specification, technical features related to the operating mode may be described.

According to an embodiment, an EHT standard STA (hereinafter, EHT STA) (or HE STA) may operate in a 20 MHz channel width mode. In the 20 MHz channel width mode, the EHT STA may operate by reducing the operating channel width to 20 MHz using an operating mode indication (OMI).

According to an embodiment, the EHT STA (or HE STA) may operate in an 80 MHz channel width mode. For example, in the 80 MHz channel width mode, the EHT STA may operate by reducing the operating channel width to 80 MHz using an operating mode indication (OMI).

According to an embodiment, the EHT STA may support subchannel selective transmission (SST). In order to cope with fading in a narrow subchannel, an STA supporting the SST may quickly select another channel during transmission and switch to the corresponding channel.

The 802.11be standard (i.e., the EHT standard) may provide a higher data rate than the 802.11ax standard. The extreme high throughput (EHT) standard can support a wide bandwidth (up to 320 MHz) transmission, a 16-stream transmission, and a multi-band operation.

In the EHT standard, various preamble puncturing or multiple RU allocation may be supported in wide bandwidth (up to 320 MHz) and SU/MU transmission. In addition, in the EHT standard, a signal transmission/reception method through 80 MHz segment allocation is being considered in order to support a low-end capability STA (e.g., an 80 MHz only operating STA). Accordingly, in the following specification, an EHT-SIG configuration method and a transmission method therefor may be proposed during MU transmission in consideration of subchannel selective transmission (SST) and multi-RU aggregation defined in the 11ax standard.

Configuration of EHT PPDU To support a transmission method based on the EHT standard, a new frame format may be used. When transmitting a signal through the 2.4/5/6 GHz band using the new frame format, conventional Wi-Fi receivers/STAs (e.g., receivers supporting 802.11n/ac/ax standard), as well as a receiver supporting the EHT standard, may receive the EHT signal transmitted through the 2.4/5/6 GHz band.

The preamble of the PPDU based on the EHT standard may be set in various ways. Hereinafter, an embodiment in which a preamble of a PPDU based on the EHT standard is configured may be described. Hereinafter, a PPDU based on the EHT standard may be described as an EHT PPDU. However, the EHT PPDU is not limited to the EHT standard. The EHT PPDU may include not only the 802.11be standard (i.e., the EHT standard) but also a PPDU based on a new standard defined by improving/evolving/extending the 802.11be standard.

Figure 16:
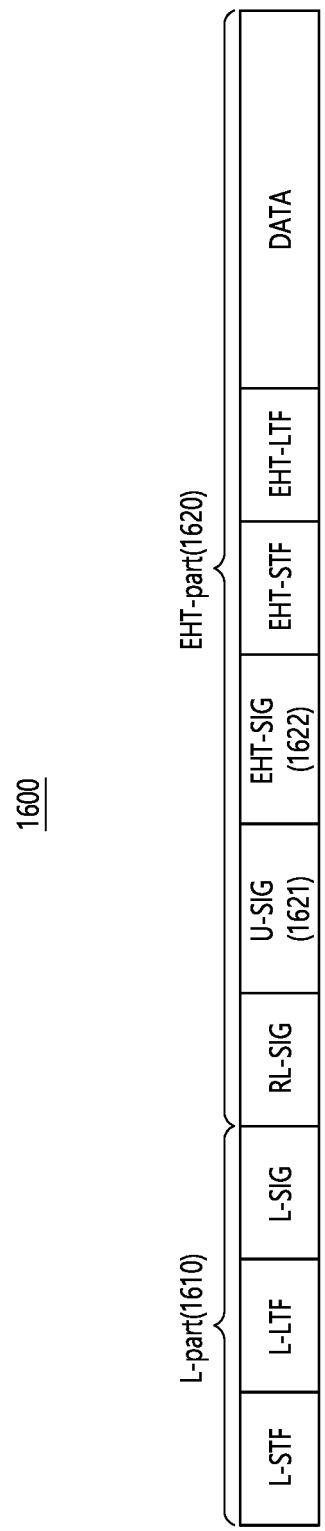
FIG. 16 shows an example of an EHT PPDU.

FIG. 16 shows an example of an EHT PPDU.

Referring to FIG. 16, the EHT PPDU 1600 may include an L-part 1610 and an EHT-part 1620. The EHT PPDU 1600 may be configured in a format to support backward compatibility. In addition, the EHT PPDU 1600 may be transmitted to a single STA and/or multiple STAs. The EHT PPDU 1600 may be an example of an EHT MU-PPDU.

EHT PPDU 1600 may have a structure in which the L-part 1610 is first transmitted before the EHT-part 1620 for support coexistence or backward compatibility with the legacy STA (e.g., STA in compliance with 802.11n/ac/ax standard). For example, the L-part 1610 may include the L-STF, the L-LTF, and the L-SIG. For example, phase rotation may be applied to the L-part 1610.

According to an embodiment, the EHT part 1620 may include the RL-SIG, U-SIG 1621, EHT-SIG 1622, EHT-STF, EHT-LTF and data field. Similar to the 11ax standard, the RL-SIG may be included in the EHT part 1620 for reliability and range extension of the L-SIG. The RL-SIG may be transmitted immediately after the L-SIG, and the L-SIG may be configured to be repeated.

For example, four additional subcarriers may be applied to the L-SIG and RL-SIG. The extra subcarriers may be configured as [−28, −27, 27, 28]. The extra subcarriers may be modulated in a BPSK scheme. In addition, coefficients of [−1-1 −1 1] may be mapped to the extra subcarriers.

For example, the EHT-LTF may be configured as one of 1×EHT-LTF, 2×EHT-LTF, or 4×EHT-LTF. The EHT standard may support EHT-LTF for 16 spatial streams.

Each field in FIG. 16 may be the same as each field described in FIG. 13.

Hereinafter, a first control signal field (e.g., U-SIG field) and a second control signal field (e.g., EHT-SIG field) will be described in detail.

Control information not included in the first control signal field (e.g., U-SIG field) may be referred to by various names such as overflowed information or overflow information. The second control signal field (e.g., EHT-SIG field) may include a common field and a user specific field. Each of the common field and the user specific field may include at least one encoding block (e.g., a binary convolutional code (BCC) encoding block). One encoding block may be transmitted/received through at least one symbol, and one encoding block is not necessarily transmitted through one symbol. Meanwhile, one symbol for transmitting the encoding block may have a symbol length of 4 µs.

The transmission/reception PPDU proposed in the present specification may be used for communication for at least one user. For example, the technical features of the present specification may be applied to a MU-PPDU (e.g., EHT MU PPDU) according to the 11be standard.

FIG. 17 shows an example of a first control signal field or U-SIG field of the present specification.

As shown, the first control signal field (e.g., U-SIG field) may include a version independent field 1710 and a version dependent field 1720. For example, the version independent field 1710 may include control information that is persistently included regardless of a physical version of the WLAN (e.g., the IEEE 802.11be standard and its evolution). For example, the version dependent field 1720 may include control information dependent on a corresponding physical Version (e.g., the IEEE 802.11be standard). For example, the Version independent field 1710 may include information related to a 3-bit version identifier indicating a Wi-Fi version including the 11be standard and/or its evolution, a 1-bit DL/UL field, a BSS color, and/or a TXOP duration. For example, the version dependent field 1720 may include information related to a PPDU format type (and/or Bandwidth) and information related to an MCS.

For example, in the first control signal field (e.g., U-SIG field) shown in FIG. 17, two symbols (e.g., two consecutive 4 µs-long symbols) may be jointly encoded. In addition, the field of FIG. 17 may be configured based on 52 data tones and 4 pilot tones for each 20 MHz band/channel. In addition, the field of FIG. 17 may be modulated in the same manner as the HE-SIG-A of the conventional 11ax standard. In other words, the field of FIG. 17 may be modulated based on BPSK with a 1/2 code rate.

For example, the second control signal field (e.g., EHT-SIG field) may be divided into a common field and a user specific field and may be encoded based on various MCS levels. For example, the common field may include indication information related to a spatial stream used in a transmission/reception PPDU (e.g., a data field) and indication information related to an RU. For example, the user specific field may include ID information, MCS information, and/or coding-related information used by at least one specific user (or receiving STA). In other words, the user specific field may include decoding information (e.g., STA ID information, MSC information, and/or channel coding type/rate information assigned to a corresponding RU) for the data field to be transmitted through at least one RU indicated by an RU allocation subfield included in the common field.

Hereinafter, the structure of the wireless LAN signal proposed in the present specification will be described in more detail.

The above-described EHT-SIG may be configured with a content channel configured with a 20 MHz segment, and the EHT-SIG may be configured with a plurality of content channels (e.g., two different content channels) in an 80 MHz segment. For example, for the EHT-SIG, a total of four content channels (i.e., two first content channels and two second content channels) may be included in one 80 MHz segment. In addition, when the total bandwidth of the PPDU including the EHT-SIG is greater than 80 MHz, the EHT-SIG may be configured differently for each 80 MHz segment.

Figure 18:
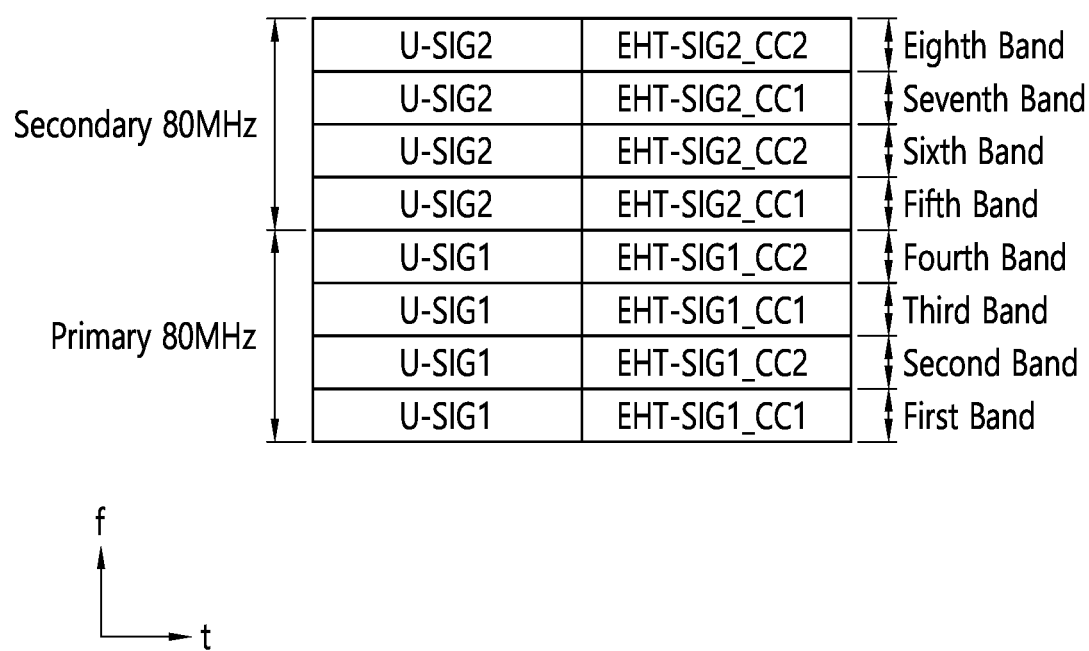
FIG. 18 shows an example of the structure of a PPDU for the 160 MHz band.

FIG. 18 shows an example of the structure of a PPDU for the 160 MHz band. Here, the structure of FIG. 18 may represent the U-SIG and EHT-SIG of FIG. 13.

Referring to FIG. 18, the EHT-SIG may be transmitted through two 80 MHz segments. One of the two 80 MHz segments may be included in a Primary 80 MHz band, and the other may be included in a Secondary 80 MHz band. In the following example, two 80 MHz segments may be referred to as a primary 80 MHz segment and a secondary 80 MHz segment. Here, each of the primary 80 MHz segment and the secondary 80 MHz segment may include four 20 MHz subchannels.

Referring to FIG. 18, each of the four 20 MHz subchannels included in the primary 80 MHz segment may include the same U-SIG (i.e., U-SIG1 in FIG. 18). In addition, each of the four 20 MHz subchannels included in the secondary 80 MHz segment may include the same U-SIG (i.e., U-SIG2 in FIG. 18). In other words, the U-SIG field may be duplicated in frequency within one 80 MHz segment. That is, the same four U-SIGs may be included in one 80 MHz segment. In addition, the PPDU exceeding the 80 MHz bandwidth may include different U-SIGs (e.g., U-SIG1 and U-SIG2 of FIG. 18). For example, the U-SIG field for the primary 80 MHz segment (i.e., U-SIG1 in FIG. 18) may include information related to the entire 160 MHz band and information related to the primary 80 MHz segment, The U-SIG field for the secondary 80 MHz segment (i.e., U-SIG2 in FIG. 18) may include information related to the entire 160 MHz band and information related to the secondary 80 MHz segment.

Hereinafter, the primary 80 MHz segment may include a plurality of first content channels and a plurality of second content channels. In the primary 80 MHz segment of FIG. 18, a plurality of first content channels may be indicated by EHT-SIG1_CC1, and the plurality of second content channels may be indicated by EHT-SIG1_CC2. In the secondary 80 MHz segment of FIG. 18, a plurality of first content channels may be indicated by EHT-SIG2_CC1, and the plurality of second content channels may be indicated by EHT-SIG2_CC2.

Here, referring to FIG. 18, each of EHT-SIG1_CC1 and EHT-SIG2_CC1 may include a first common field. Here, the first common field may include an RU allocation subfield for each of the first band/subchannel, the third band/subchannel, the fifth band/subchannel, and the seventh band/subchannel. An example of FIG. 18 may relate to the U-SIG and EHT-SIG for transmission of 160 MHz PPDU. The 160 MHz PPDU may be transmitted through 8 consecutive bands (or 8 consecutive subchannels). The band/subchannel may be represented by first to eighth bands/subchannels). For example, the first band (or the first subchannel) may be continuous in frequency with the second band (or the second subchannel). For example, at least one RU included in the data field of the 160 MHz PPDU may be transmitted through the 8 bands/subchannels. For example, in the present specification, the RU allocation subfield for the N-th band/subchannel may mean allocation information for at least one RU transmitted through the N-th band/subchannel, as described below. The RU allocation subfield for the N-th band/subchannel can have a length of 9 bits.

In addition, each of the EHT-SIG1_CC2 and the EHT-SIG2_CC2 may include a second common field. Here, the second common field may include an RU allocation subfield for each of the second band/subchannel, the fourth band/subchannel, the sixth band/subchannel, and the eighth band/subchannel.

Hereinafter, the EHT-SIG content channel format according to the bandwidth of the PPDU including the EHT-SIG will be described based on FIGS. 19 to 21.

According to the bandwidth of the PPDU including the EHT-SIG, the EHT-SIG content channel may include a number of RU allocation fields as follows.

Figure 19:
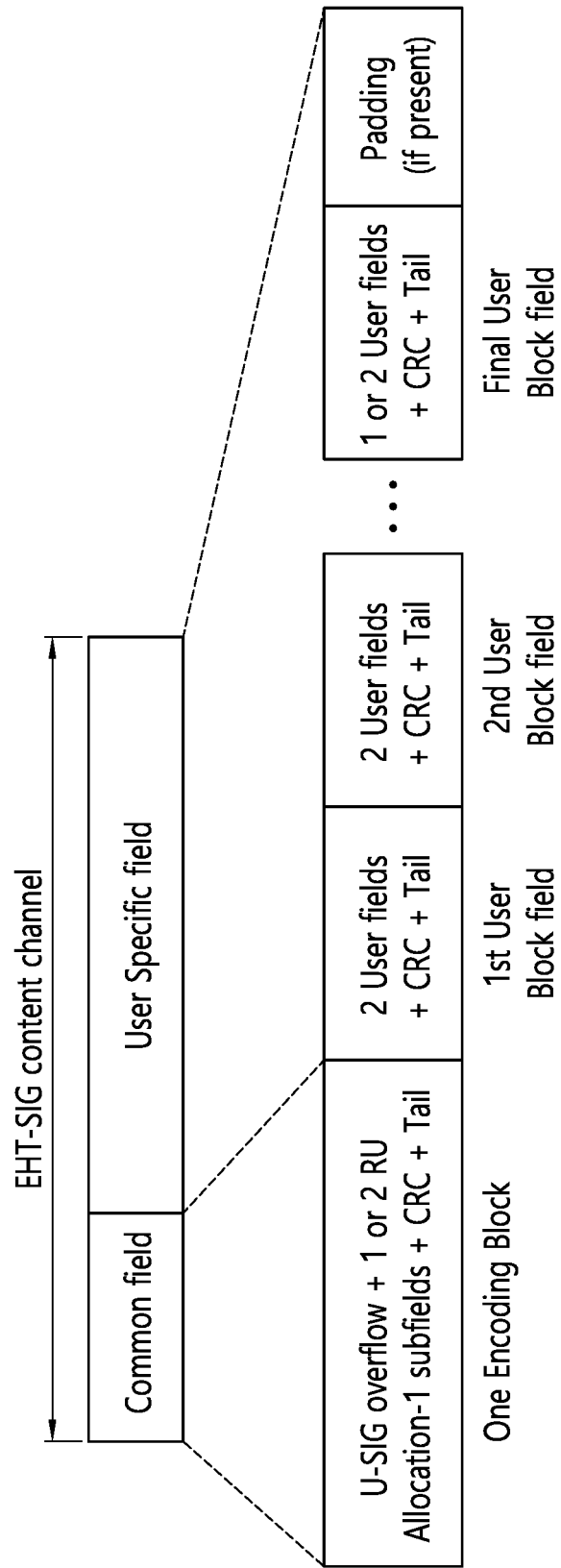
FIG. 19 illustrates an example of an EHT-SIG content channel format for OFDMA transmission in 20 MHz, 40 MHz, and/or 80 MHz bands.

FIG. 19 illustrates an example of an EHT-SIG content channel format for OFDMA transmission in 20 MHz, 40 MHz, and/or 80 MHz bands.

Referring to FIG. 19, for an EHT-SIG included in a 20 MHz PPDU and/or an EHT-SIG included in a 40 MHz PPDU, one EHG-SIG content channel included in the EHT-SIG may include one RU allocation subfield. Here, one RU allocation subfield included in one EHG-SIG content channel for the 20 MHz band and/or the 40 MHz band may be included in one encoding block in the common field of the EHT-SIG content channel.

Also, referring to FIG. 19, for an EHT-SIG included in an 80 MHz PPDU, any one of a plurality of EHG-SIG content channels included in the EHT-SIG may include two RU allocation subfields. Here, two RU allocation subfields included in one EHG-SIG content channel for the 80 MHz band may be included in one encoding block in the common field of the EHT-SIG content channel.

Figure 20:
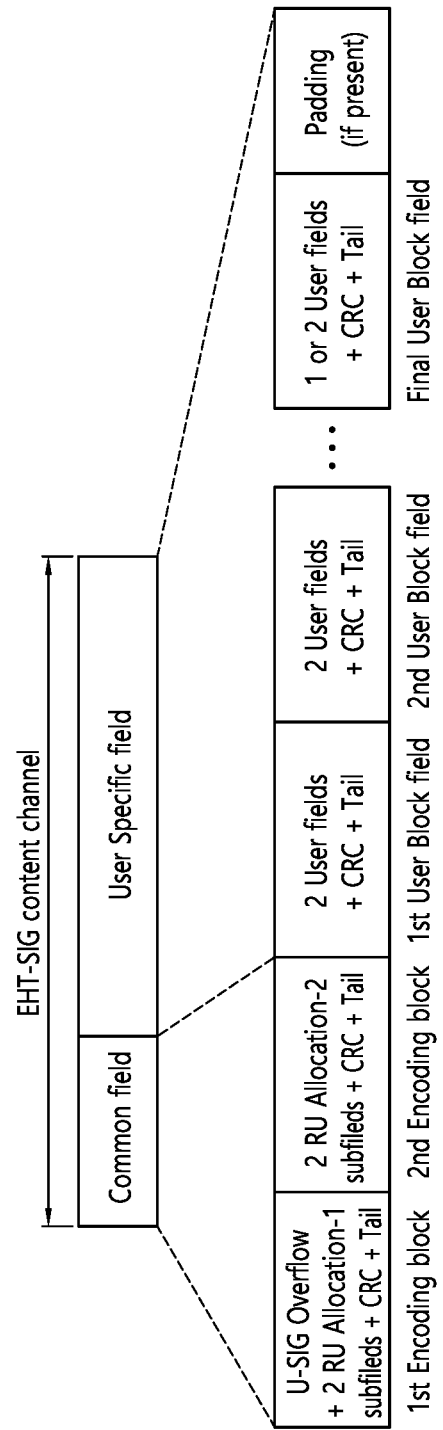
FIG. 20 illustrates an example of an EHT-SIG content channel format for OFDMA transmission in a 160 MHz band.

FIG. 20 illustrates an example of an EHT-SIG content channel format for OFDMA transmission in a 160 MHz band.

For an EHT-SIG included in the 160 MHz PPDU, any one of the plurality of EHG-SIG content channels included in the EHT-SIG may include four RU allocation subfields. In this example, the four RU allocation subfields included in one EHG-SIG content channel for the 160 MHz band may be included in two encoding blocks in the common field of the EHT-SIG content channel. Specifically, two of the four RU allocation subfields may be included in the first encoding block, and the remaining two RU allocation subfields may be included in the second encoding block.

Figure 21:
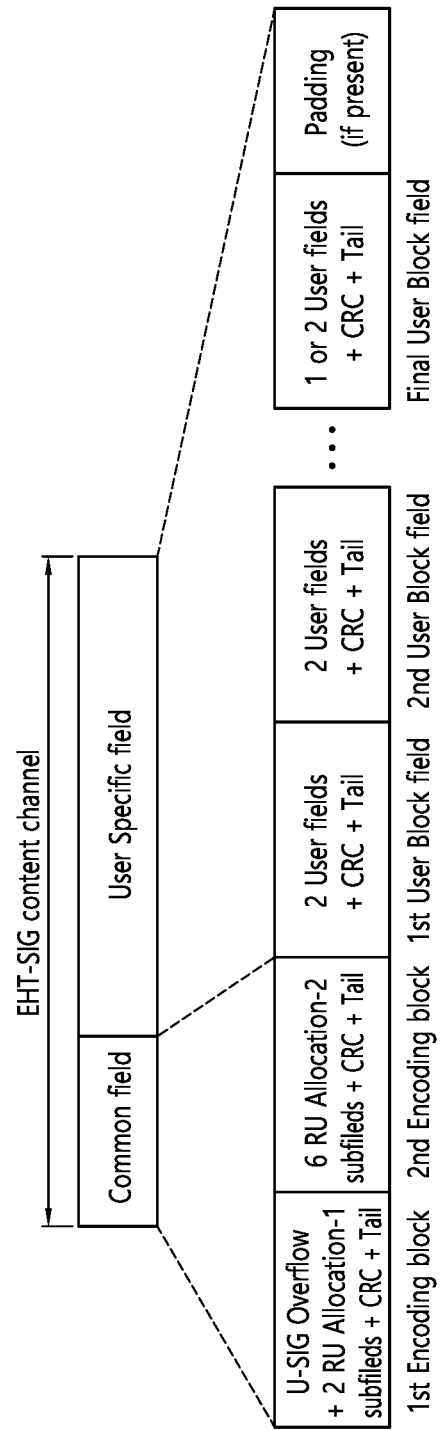
FIG. 21 shows an example of an EHT-SIG content channel format for OFDMA transmission in a 320 MHz band.

FIG. 21 shows an example of an EHT-SIG content channel format for OFDMA transmission in a 320 MHz band.

For an EHT-SIG included in the 320 MHz PPDU, any one of the plurality of EHG-SIG content channels included in the EHT-SIG may include 8 RU allocation subfields. In this example, 8 RU allocation subfields included in one EHG-SIG content channel for the 320 MHz band may be included in two encoding blocks in the common field of the EHT-SIG content channel. Specifically, two of the eight RU allocation subfields may be included in the first encoding block, and the remaining six RU allocation subfields may be included in the second encoding block.

Meanwhile, each of the plurality of RU allocation subfields shown in FIGS. 19 to 21 may be a 9-bit field. The 9-bit RU allocation subfield may be defined by modifying an example of the 8-bit RU allocation information defined in the above-explained Tables 5 to 7. As described above, when transmitting the EHT-SIG included in the 320 MHz PPDU, there may be a total of 8 RU allocation subfields included in the EHT-SIG of the 80 MHz segment. In this example, when information on all users to which RUs are allocated by each RU allocation subfield is included in the user specific field, a technical problem in which the signaling overhead of the EHT-SIG increases may occur.

Meanwhile, in the next-generation wireless LAN such as the IEEE 802.11be standard, signaling may be optimized for each 80 MHz segment. In this way, in order to optimize the EHT-SIG for each 80 MHz segment, the present specification proposes the following EHT-SIG configuration.

Technical Features 1. For example, the present specification may propose a method of setting the RU allocation subfield for the remaining 80 MHz segment except for the RU allocation information for one 80 MHz segment using a zero user field.

Technical Features 1.A. For example, the RU allocation subfield of the EHT-SIG included in each 80 MHz segment for the 160 MHz PPDU may be based on the following technical characteristics. For the convenience of explanation, the following technical features may be described based on an example of FIG. 18.

Technical Features 1.A.i. A primary 80 MHz segment may be configured as follows. In the present specification, RAn (i.e., RA1, RA2, . . . , RA #n) may denote an RU allocation subfield for RUs transmitted through the n-th (i.e., n is an integer greater than or equal to 1) 20 MHz band/subchannel constituting the EHT-SIG.

Technical Features 1.A.i.1. EHT-SIG1_CC1

RA1 and RA3 may consist of actually allocated RU allocation information, and RA5 and RA7, which are RU information for another 80 MHz segment, may be set as a zero user field. In other words, referring to FIG. 18, EHT-SIG1_CC1 may include a plurality of RU allocation subfields related to a plurality of RUs included in each of the first band (or 20 MHz subchannel), the third band, the fifth band, and the seventh band. Here, in RA1 (i.e., the RU allocation subfield for the first band in FIG. 18), information related to the location of at least one RU actually allocated in a first band (i.e., at least one included in the data field transmitted through the first band) is allocated. In RA3, information related to the location of at least one RU actually allocated in a third band (i.e., at least one included in the data field transmitted through the third band) is allocated. Further, information related to the location of at least one RU actually allocated in the fifth band is not allocated to RA5, but an RU allocation subfield (or zero user field) having a preset value for a zero user may be allocated instead. In addition, information related to the location of at least one RU that is actually allocated in the seventh band is not allocated to RA7, but an RU allocation subfield (or zero user field) having a preset value for a zero user may be allocated instead.

Technical Features 1.A.i.2. EHT-SIG1_CC2

RA2 and RA4 may consist of actually allocated RU allocation information, and RA6 and RA8, which are RU information for another 80 MHz segment, are set as a zero user field. In other words, in RA2, information related to the location of at least one RU actually allocated in a second band is allocated. In RA4, information related to the location of at least one RU actually allocated in a fourth band is allocated. Further, information related to the location of at least one RU actually allocated in the sixth band is not allocated to RA6, but an RU allocation subfield (or zero user field) having a preset value for a zero user may be allocated instead. In addition, information related to the location of at least one RU that is actually allocated in the eighth band is not allocated to RA8, but an RU allocation subfield (or zero user field) having a preset value for a zero user may be allocated instead.

Technical Features 1.A.i.3. EHT-SIG1_CC1 and EHT-SIG1_CC2 may be configured to include only user fields for users allocated by RA1 & RA3 and RA2 & RA4, respectively.

That is, as described in FIG. 13 and the like, the EHT-SIG may include a user specific field. The number of user specific fields may be determined based on the number of users, and one user block field included in the user specific field may include up to two user fields. According to an example of the present specification, the EHT-SIG1_CC1 may not include user fields for RA5 and RA7 but may include only user fields for RA1 and RA3. Similarly, the EHT-SIG1_CC2 may not include user fields for RA6 and RA8 but may include only user fields for RA2 and RA4.

Technical Features 1.A.ii. The secondary 80 MHz segment may be configured as follows.

Technical Features 1.A.ii.1. EHT-SIG2_CC1

RA5 and RA7 may consist of actually allocated RU allocation information for the secondary 80 MHz segment, and RA1 and RA3, which are RU information for another 80 MHz segment, may be set to be a zero user field. In other words, information related to the location of at least one RU that is actually allocated in the fifth band is allocated to RA5 (that is, the RU allocation subfield for the fifth band in FIG. 18), and information related to the location of at least one RU actually allocated in the seventh band may be allocated to RA7. In addition, information related to the location of at least one RU that is actually allocated in the first band is not allocated to RA1, but an RU allocation subfield (or zero user field) having a preset value for a zero user may be allocated instead. In addition, information related to the location of at least one RU that is actually allocated in the third band is not allocated to RA3, but an RU allocation subfield (or zero user field) having a preset value for a zero user may be allocated instead.

Technical Features 1.A.ii.2. EHT-SIG2_CC2

RA6 and RA8 may consist of actually allocated RU allocation information for the secondary 80 MHz, and RA2 and RA4, which are RU information for another 80 MHz segment, may be set as a zero user field. In other words, information related to the location of at least one RU actually allocated in the sixth band is allocated to RA6 (that is, the RU allocation subfield for the sixth band in FIG. 18), and information related to the location of at least one RU actually allocated in the eighth band may be allocated to RA8. In addition, information to the location of at least one RU actually allocated in the second band is not allocated to RA2, but an RU allocation subfield (or zero user field) having a preset value for a zero user may be allocated instead. In addition, information related to the location of at least one RU that is actually allocated in the fourth band is not allocated to RA4, but an RU allocation subfield (or zero user field) having a preset value for a zero user may be allocated instead.

Technical Features 1.A.ii.3. EHT-SIG2_CC1 and EHT-SIG2_CC2 may include only user fields for users assigned by RA5 & RA7 and RA6 & RA8, respectively. In other words, the EHT-SIG2_CC1 may not include the user field for RA1 and RA3 but may include only the user field for RA5 and RA7. Similarly, the EHT-SIG2_CC2 may not include user fields for RA2 and RA4 but may include only user fields for RA6 and RA8.

Technical Features 1.B. That is, when the EHT-SIG for any one 80 MHz segment is configured, the RU allocation subfield for another 80 MHz segment excluding the above one 80 MHz segment may be set as a zero user subfield. Accordingly, the EHT SIG for a specific 80 MHz segment may not include a user field for a user to which an RU is assigned to an 80 MHz segment other than the specific 80 MHz segment. As a result, when the EHT-SIG according to an example of the present specification is used, a technical effect of reducing the signaling overhead of the EHT-SIG may occur.

The above technical features can be described in various ways. The above-described technical features may be described as follows based on the example of FIG. 22.

Figure 22:
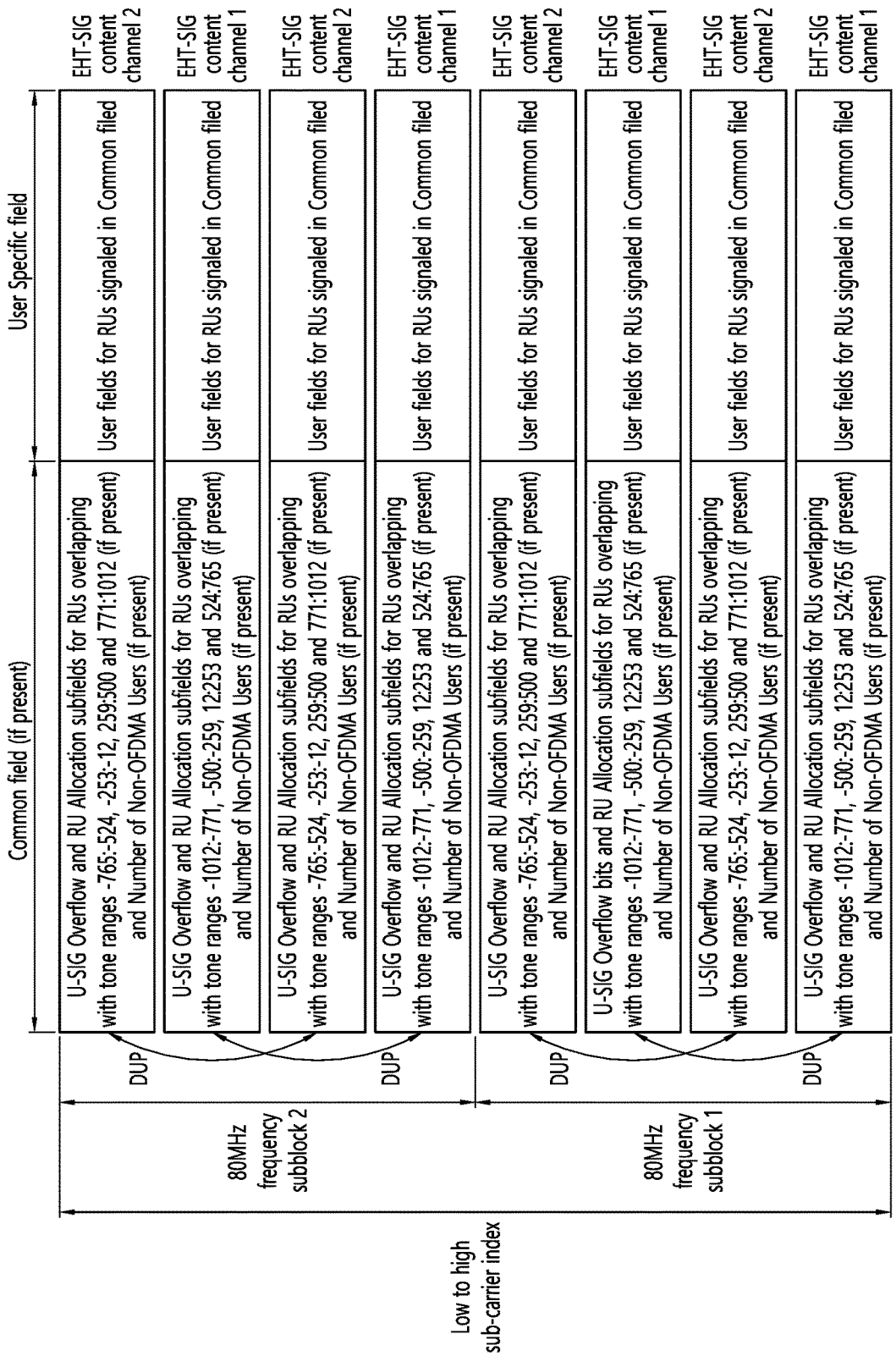
FIG. 22 illustrates an example of a plurality of EHT-SIG content channels included in a PPDU of a 160 MHz band.

FIG. 22 illustrates an example of a plurality of EHT-SIG content channels included in a PPDU of a 160 MHz band. The example of FIG. 22 may be used for OFDMA transmission and non-OFDMA transmission for a plurality of users.

Referring to FIG. 22, a 160 MHz PPDU may include a total of 8 EHT-SIG content channels. Here, as shown in FIG. 18, when defining from the first band/subchannel corresponding to the band having the lowest subcarrier index to the eighth band/subchannel corresponding to the band having the highest subcarrier index, four EHT-SIG content channels corresponding to the first band to the fourth band may be represented by '80 MHz frequency subblock 1', and four EHT-SIG content channels corresponding to the fifth band to the eighth band may be represented by '80 MHz frequency subblock 2'. In addition, the 80 MHz frequency subblock 1 and 80 MHz frequency subblock 2 of FIG. 22 may correspond to the primary 80 MHz segment and the secondary 80 MHz segment of FIG. 18, respectively.

Referring to FIG. 22, the RU allocation information included in the common field of the EHT-SIG content channel of the first band/subchannel includes four RU allocation fields, i.e., a first RU allocation field for RUs overlapping in a tone range of −1012 to −771, a third RU allocation field for RUs overlapping in a tone range of −500 to −259, a fifth RU allocation field for RUs overlapping in a tone range of 12 to 253, and a seventh RU allocation field for RUs overlapping in a tone range of 524 to 765. In addition, a user specific field of the EHT-SIG content channel of the first band may include a user field for RUs corresponding to the four tone ranges.

Similarly, the RU allocation information included in the common field of the EHT-SIG content channel of the second band/subchannel includes four RU allocation fields, i.e., a second RU allocation field for RUs overlapping in a tone range of −756 to −524, a fourth RU allocation field for RUs overlapping in a tone range of −253 to −12, a sixth RU allocation field for RUs overlapping in a tone range of 259 to 500, and an eighth RU allocation field for RUs overlapping in a tone range of 771 to 1012. In addition, a user specific field of the EHT-SIG content channel of the second band may include user fields for RUs corresponding to the four tone ranges.

Here, the first RU allocation field to the eighth RU allocation field of FIG. 22 may be specific examples of the aforementioned RA1 to RA8.

In the meantime, according to an example of the present specification, the first RU allocation field and the third RU allocation field are configured in the common field of the EHT-SIG content channel of the first band of FIG. 22, and a zero user field may be inserted into positions corresponding to the fifth RU allocation field and the seventh RU allocation field. In this case, only the user field corresponding to the first RU allocation field and the user field corresponding to the third RU allocation field may be included in the user specific field of the EHT-Sig content channel of the first band. In addition, in the common field of the EHT-Sig content channel of the second band of FIG. 22, the second RU allocation field and the fourth RU allocation field are configured, a zero user field may be inserted into positions corresponding to the sixth RU allocation field and the eighth RU allocation field. In this case, only the user field corresponding to the second RU allocation field and the user field corresponding to the fourth RU allocation field may be included in the user specific field of the EHT-Sig content channel of the second band.

Accordingly, the EHT-SIG content channel according to an example of the present specification may include a reduced length of the user specific field length. Through this, a technical effect of increasing signaling efficiency for EHT-SIG may be generated.

Technical Features 1.C. Meanwhile, an RU allocation subfield (or zero user field) having a preset value for a zero user may be set according to the following method.

Technical Features 1.C.i. In the present specification, an RU allocation subfield (or zero user field) having a preset value for a zero user may be a 242-tone RU zero user field or an RU allocation subfield for 242-tone RU empty according to a conventional standard.

Technical Features 1.C.i.1. As described above, since the zero user field is configured in units of 242-tone RU, that is corresponding to a 20 MHz band, flexible transmission in which the segment of the control field and the segment of the allocated RU are differently allocated can be supported.

Technical Features 1.C.ii. For another example, in order to indicate a zero user for all RUs for the 80 MHz segment, the 996 RU zero user field can be an example of an RU allocation subfield (or zero user field) having a preset value for the aforementioned zero user.

Technical Features 1.D. Meanwhile, even when a large-size RU aggregation is used, RA information for another 80 MHz segment other than the 80 MHz segment allocated to the STA may be set as a zero user field as described above.

Technical Features 1.Di Here, the STA can attempt to decode only the EHT-SIG for the allocated 80 MHz and figure out allocation information for a large size RU aggregation through the RA information of the allocated (or parked) 80 MHz segment.

On the other hand, the above-mentioned rules may also be applied to the EHT-SIG corresponding to a band greater than 160 MHz. In the case of the EHT-SIG for a 320 MHz band as shown in FIG. 21, the total number of EHT-SIG content channels included in the EHT-SIG can be 16, and one EHG-SIG content channel included in the EHT-SIG may include 8 RU allocation subfields.

Here, when the 20 MHz band to which the 16 EHT-SIG content channels are allocated is defined as a $1^{st}$ band (or a 1 subchannel) to a $16^{th}$ band (or a $16^{th}$ subchannel), respectively, the $1^{st}$ to $4^{th}$ band may be represented by a first 80 MHz segment, the $5^{th}$ to $8^{th}$ bands may be represented by a second 80 MHz segment, the $9^{th}$ to $12^{th}$ bands may be represented by a third 80 MHz segment, and the $13^{th}$ to $16^{th}$ bands may be represented by the fourth 80 MHz segment.

Here, the common fields of the EHT-SIG content channel corresponding to the first band may include RU allocation subfields for the $1^{st}$ band/subchannel, the $3^{rd}$ band, the $5^{th}$ band, the $7^{th}$ band, the $9^{th}$ band, the $11^{th}$ band, the $13^{th}$ band, and the $15^{th}$ band. According to an example of the present specification, information related to the location of at least one RU actually allocated to the $1^{st}$ band/subchannel may be allocated to the RU allocation subfield for the $1^{st}$ band/subchannel. In addition, information related to the location of at least one RU actually allocated for the $3^{rd}$ band/subchannel may be allocated to the RU allocation subfield for the $3^{rd}$ band/subchannel. In addition, in the RU allocation subfield allocated to the $5^{th}$ band, the $7^{th}$ band, the $9^{th}$ band, the $11^{th}$ band, the $13^{th}$ band, and the $15^{th}$ band, an RU allocation subfield having a preset value for a zero user (or a zero user field) can be assigned. Then, the user specific field of the EHT-SIG content channel corresponding to the $1^{st}$ band/subchannel includes only the user fields for the $1^{st}$ band and the $3^{rd}$ band, and the remaining bands (i.e., the $5^{th}$ band, the $7^{th}$ band, the $9^{th}$ band, the $11^{th}$ band, the $13^{th}$ band, and the $15^{th}$ band) may not include a user field.

In the above example, the bandwidth of one segment (or frequency sub-block) is set to 80 MHz, but the bandwidth of the segment may be variously changed. For example, in the next-generation wireless LAN, signals may be configured differently for each 160 MHz segment. Specifically, in the case of the EHT-SIG for the 320 MHz band as shown in FIG. 21, the total number of EHT-SIG content channels included in the EHT-SIG is 16, and one EHG-SIG content channel included in the EHT-SIG may include 8 RU allocation subfields. Here, the 320 MHz EHT-SIG may be transmitted through 16 consecutive bands (or 16 consecutive subchannels). The band/subchannel may be represented by first to sixteenth bands (or subchannels). For example, the first band (or first subchannel) may be continuous in frequency with the second band (or second subchannel).

Here, the common field of the EHT-SIG content channel may include an RU allocation subfield for each of the first band/subchannel are the first band, the third band, the fifth band, the seventh band, the ninth band, the eleventh band, the thirteenth band, and the fifteenth band. Here, according to an example of the present specification, information on the location of at least one RU actually allocated to the first band/subchannel may be allocated to the RU allocation field for the first band/subchannel. In addition, information on the location of at least one RU actually allocated to the third band/subchannel may be allocated to the RU allocation field for the third band/subchannel. In addition, information on the location of at least one RU actually allocated to the fifth band/subchannel may be allocated to the RU allocation field for the fifth band/subchannel. In addition, information on the location of at least one RU actually allocated to the seventh band/subchannel may be allocated to the RU allocation field for the seventh band/subchannel. Also, an RU allocation subfield or a zero unit field having a preset value for a zero user may be allocated to the RU allocation subfield for the ninth band, the eleventh band, the thirteenth band, and the fifteenth band. Then, the user specific field of the EHT-SIG content channel corresponding to the first band may include only user fields for the first band, the third band, the fifth band, and the seventh band. In addition, the user specific field of the EHT-SIG content channel corresponding to the first band may not include the user field for the remaining bands (i.e., the ninth band, the eleventh band, the thirteenth band, and the fifteenth band).

That is, to generalize the method/rule proposed in the present specification, the common field of the EHT-SIG includes RU allocation subfields related to odd subchannels or even subchannels among a plurality of 20 MHz subchannels to which the EHT-SIG is allocated. Here, for example, when the transmitting apparatus transmits an EHT-SIG including RU allocation subfields for odd subchannels, the transmitting apparatus may allocate information on the location of at least one RU actually allocated for a subchannel included in the segment to which the EHT-SIG is allocated to the RU allocation subfield for the corresponding subchannel. In addition, the transmitting apparatus may allocate an RU allocation subfield (or zero user field) having a preset value for a zero user to the RU allocation subfield for a subchannel not included in the segment to which the EHT-SIG is allocated. In addition, the transmitting apparatus may include only a user field for a subchannel included in a segment in which the EHT-SIG is transmitted in a user specific included in the EHT-SIG.

Figure 23:
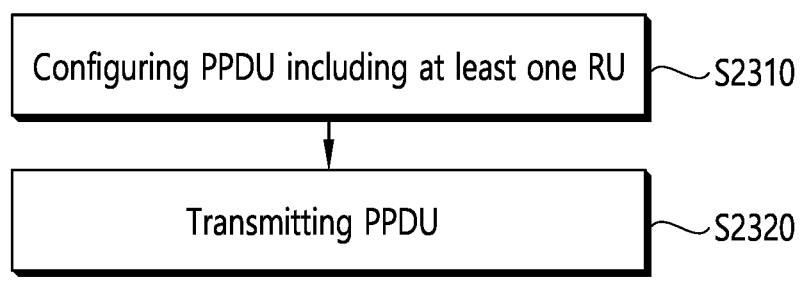
FIG. 23 is a flowchart of an example of a PPDU transmission method of a transmitting apparatus according to the present specification.

FIG. 23 is a flowchart of an example of a PPDU transmission method of a transmitting apparatus according to the present specification. The example of FIG. 23 may be performed in a non-AP or an AP. For example, the example of FIG. 23 may be performed by the AP transmitting the MU-PPDU.

Referring to S2310 of FIG. 23, the transmission apparatus configures a Physical Protocol Data Unit (PPDU) including at least one Resource Unit (RU).

Thereafter, the transmitting apparatus transmits the PPDU (S2320).

Here, the PPDU may include at least one legacy field, a universal signal field for interpreting the PPDU, a control signal field including allocation information related to the at least one RU, and a data field. Here, the at least one legacy field may include at least one of L-LTF, L-STF, and L-SIG of FIG. 13.

In addition, the PPDU may be transmitted through a plurality of segments including a first segment and a second segment. Here, the first segment and the second segment may be a primary 80 MHz segment and a secondary 80 MHz segment of FIG. 18, or may be the 80 MHz frequency subblock 1 and the 80 MHz frequency subblock 2 of FIG. 22. Alternatively, it may be the aforementioned 160 MHz segment.

Also, the data field may be transmitted through a plurality of 20 MHz subchannels, and the plurality of 20 MHz subchannels may include odd subchannels and even subchannels.

In addition, the control signal field may include a plurality of content channels, and the plurality of content channels may include a plurality of first content channels and a plurality of second content channels. Here, each of the plurality of content channels may be an EHT-SIG content channel. In addition, the plurality of first content channels may be the aforementioned EHT-SIG1_CC1 and EHT-SIG2_CC1, and the plurality of second content channels may be the aforementioned EHT-SIG1_CC2 and EHT-SIG2_CC2.

In addition, at least one channel included in the first segment among the plurality of first content channels includes a first common field. The first common field may include a first RU allocation subfield for at least one RU included in the first segment among the odd subchannels and a second RU allocation subfield for at least one RU included in the second segment among the odd subchannels. Here, the common field may be the common field of FIGS. 19 to 21, and the RU allocation subfield may be the RU Allocation subfield of FIGS. 19 to 21.

In addition, at least one channel included in the first segment among the plurality of second content channels includes a second common field. The second common field may include a third RU allocation subfield for at least one RU included in the first segment among the even subchannels and a fourth RU allocation subfield for at least one RU included in the second segment among the even subchannels.

In addition, the second RU allocation subfield included in the first common field and the fourth RU allocation subfield included in the second common field may be set to a preset value for a zero user. Here, the preset value for a zero user may be the aforementioned zero user field.

Furthermore, at least one channel included in the first segment among the plurality of first content channels may include a first user specific field. Here, the first user specific field may include a user field for decoding at least one RU included in the first segment among the odd subchannels. In this case, the first user specific field may not include a user field for decoding at least one RU included in the second segment among the odd subchannels. Specifically, the first user specific field may include only a user field for decoding at least one RU included in the first segment among the odd subchannels.

Similarly, at least one channel included in the first segment among the plurality of second content channels may include a second user specific field. Here, the second user specific field may include a user field for decoding at least one RU included in the first segment among the even subchannels. In this case, the second user specific field may not include a user field for decoding at least one RU included in the second segment among the even subchannels. Specifically, the second user specific field may include only a user field for decoding at least one RU included in the first segment among the even subchannels.

Meanwhile, although the example of FIG. 23 has been described based on the first segment, the example of FIG. 23 may be equally applicable to the second segment.

Specifically, at least one channel included in the second segment among the plurality of first content channels may include a third common field. Here, the third common field may include a fifth RU allocation subfield for at least one RU included in the first segment among the odd subchannels, a sixth RU allocation subfield for at least one RU included in the second segment among the odd subchannels.

Also, at least one channel included in the second segment among the plurality of second content channels may include a fourth common field. Here, the fourth common field may include a seventh RU allocation subfield for at least one RU included in the first segment among the even subchannels, and an eighth RU allocation subfield for at least one RU included in the second segment among the even subchannels.

Here, the fifth RU allocation subfield and the seventh RU allocation subfield may be set to a preset value for a zero user.

Here, the common field may be the common field of FIGS. 19 to 21, and the RU allocation subfield may be the RU Allocation subfield of FIGS. 19 to 21.

Furthermore, at least one channel included in the second segment among the plurality of first content channels may include a third user specific field. Here, the third user specific field may include a user field for decoding at least one RU included in the second segment among the odd subchannels. In this case, the third user specific field may not include a user field for decoding at least one RU included in the first segment among the odd subchannels. Specifically, the third user specific field may include only a user field for decoding at least one RU included in the second segment among the odd subchannels.

Similarly, at least one channel included in the second segment among the plurality of second content channels may include a fourth user specific field. Here, the fourth user specific field may include a user field for decoding at least one RU included in the second segment among the even subchannels. In this case, the fourth user specific field may not include a user field for decoding at least one RU included in the first segment among the even subchannels. Specifically, the fourth user specific field may include only a user field for decoding at least one RU included in the second segment among the even subchannels.

In addition, the user field may include station identifier (STA-ID) information allocated to a corresponding RU, modulation and coding scheme (MCS) information, and coding type information. For example, the STA-ID may have a length of 11 bits and may include information related to the allocated STA's AID. For example, the MCS information may have a length of 4 bits. The MCS information may include information related to constellation mapping (e.g., BPSK, QPSK, QAM, etc.) applied to the RU and information related to a coding rate applied to the RU. Here, the coding type may have a length of 1 bit and include information related to a coding type (e.g., binary convolutional code (BCC) or low-density parity-check code (LDPC)) applied to the RU.

Figure 24:
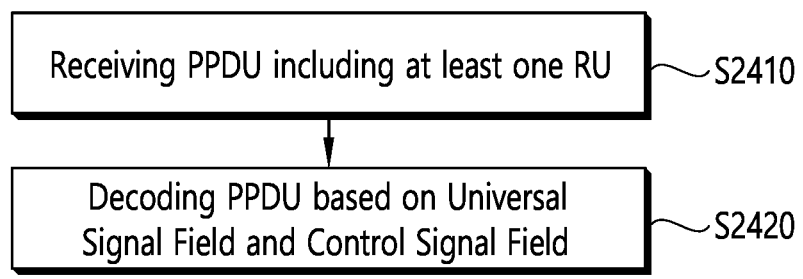
FIG. 24 is a flowchart of an example of a PPDU decoding method of a receiving apparatus according to the present specification.

FIG. 24 is a flowchart of an example of a PPDU decoding method of a receiving apparatus according to the present specification. The example of FIG. 24 may be performed in a non-AP or an AP. For example, the example of FIG. 24 may be performed at the AP receiving the MU-PPDU.

Referring to FIG. 24, the receiving apparatus may receive a PPDU including at least one resource unit (RU) according to S2410.

Here, the PPDU may include at least one legacy field, a universal signal field for interpreting the PPDU, a control signal field including allocation information related to the at least one RU, and data.

In addition, the PPDU may be transmitted through a plurality of segments including a first segment and a second segment.

Also, the data field may be transmitted through a plurality of 20 MHz subchannels, and the plurality of 20 MHz subchannels may include odd subchannels and even subchannels.

In addition, the control signal field may include a plurality of content channels, and the plurality of content channels may include a plurality of first content channels and a plurality of second content channels.

In addition, at least one channel included in the first segment among the plurality of first content channels may include a first common field. The first common field may include a first RU allocation subfield for at least one RU included in the first segment among the odd subchannels and a second RU allocation subfield for at least one RU included in the second segment among the odd subchannels.

In addition, at least one channel included in the first segment among the plurality of second content channels may include a second common field. The second common field may include a third RU allocation subfield for at least one RU included in the first segment among the even subchannels and a fourth RU allocation subfield for at least one RU included in the second segment among the even subchannels.

In addition, the second RU allocation subfield and the fourth RU allocation subfield may be set to a preset value for a zero user.

Thereafter, the receiving apparatus may decode the PPDU based on the universal signal field and the control signal field according to S2420.

Each of the operations of FIGS. 23 and 24 may be performed by the apparatus of FIGS. 1 and/or 14. For example, each of the transmitting apparatus and the receiving apparatus may be implemented with the apparatus of FIGS. 1 and/or 14. The processor of FIGS. 1 and/or 14 may perform the operation of FIGS. 23 and 24 described above. Also, the transceiver of FIGS. 1 and/or 14 may perform the operations described in FIGS. 23 and 24.

In addition, the apparatus proposed in the present specification does not necessarily include a transceiver, and may be implemented in the form of a chip including a processor and a memory. Such an apparatus may generate/store a transmission PPDU according to the example described above. Such an apparatus may be connected to a separately manufactured transceiver to support actual transmission and reception.

The present specification proposes a computer-readable recording medium implemented in various forms. A computer readable medium according to the present specification may be encoded with at least one computer program including instructions. The instructions stored in the medium may control the processor described in FIGS. 1 and/or 14. That is, the instructions stored in the medium control the processor presented herein to perform the above-described operations of the transmitting and receiving STAs (e.g., FIGS. 23 to 24).

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method in a wireless local area network (WLAN) system, the method comprising:
    configure a Physical Protocol Data Unit (PPDU) including at least one Resource Unit (RU),
    wherein the PPDU includes at least one legacy field, a universal signal field for interpreting the PPDU, a control signal field including allocation information related to the at least one RU, and a data field,
    wherein the PPDU is transmitted through a plurality of segments including a first segment and a second segment,
    wherein the data field is transmitted on a plurality of 20 MHz sub-channels, wherein the plurality of 20 MHz subchannels include odd subchannels and even subchannels,
    wherein the control signal field includes a plurality of content channels, wherein the plurality of content channels include a plurality of first content channels and a plurality of second content channels,
    wherein at least one channel included in the first segment among the plurality of first content channels includes a first common field, and the first common field includes a first RU allocation subfield for at least one RU included in the first segment among the odd subchannels and a second RU allocation subfield for at least one RU included in the second segment among the odd subchannels,
    wherein at least one channel included in the first segment among the plurality of second content channels includes a second common field, and the second common field includes a third RU allocation subfield for at least one RU included in the first segment among the even subchannels and a fourth RU allocation subfield for at least one RU included in the second segment among the even subchannels,
    wherein the second RU allocation subfield and the fourth RU allocation subfield are set to a preset value for a zero user,
    wherein at least one channel included in the second segment among the plurality of first content channels includes a third common field,
    wherein the third common field includes a fifth RU allocation subfield for at least one RU included in the first segment among the odd subchannels and sixth RU allocation subfield for at least one RU included in the second segment among the odd subchannels,
    wherein at least one channel included in the second segment among the plurality of second content channels includes a fourth common field,
    wherein the fourth common field includes a seventh RU allocation subfield for at least one RU included in the first segment among the even subchannels and eighth RU allocation subfield for at least one RU included in the second segment among the even subchannels,
    wherein the fifth RU allocation subfield and the seventh RU allocation subfield are set to a preset value for a zero user; and
    transmitting the PPDU.

2. The method of claim 1, wherein at least one channel included in the first segment among the plurality of first content channels includes a first user specific field,
    wherein the first user specific field includes a user field for decoding at least one RU included in the first segment among the odd subchannels,
    wherein the first user specific field does not include a user field for decoding at least one RU included in the second segment among the odd subchannels.

3. The method of claim 2, wherein the user field includes a station identifier (STA-ID) information, Modulation and Coding Scheme (MCS) information, and coding type information allocated to a corresponding RU.

4. The method of claim 2, wherein the first user specific field includes only a user field for decoding at least one RU included in the first segment among the plurality of segments among the odd subchannels.

5. The method of claim 1, wherein at least one channel included in the first segment among the plurality of second content channels includes a second user specific field, wherein the second user specific field includes a user field for decoding at least one RU included in the first segment among the even subchannels, wherein the second user specific field does not include a user field for decoding at least one RU included in the second segment among the even subchannels.

6. The method of claim 1, wherein at least one channel included in the second segment among the plurality of first content channels includes a third user specific field, wherein the third user specific field includes a user field for decoding at least one RU included in the second segment among the odd subchannels, wherein the third user specific field does not include a user field for decoding at least one RU included in the first segment among the odd subchannels.

7. The method of claim 1, wherein at least one channel included in the second segment among the plurality of second content channels includes a fourth user specific field, wherein the fourth user specific field includes a user field for decoding at least one RU included in the second segment among the even subchannels, wherein fourth user specific field does not include a user field for decoding at least one RU included in the first segment among the even subchannels.

8. The method of claim 1, wherein one of the plurality of first content channels is continuous in frequency with one of the plurality of second content channels.

9. The method of claim 1, wherein the first segment includes a Primary 80 MHz channel, the second segment includes a Secondary 80 MHz channel.

10. The method of claim 1, wherein the PPDU is a 160 MHz PPDU or a 320 MHz PPDU.

11. The method of claim 1, wherein the segment has a bandwidth of 80 MHz or 160 MHz.

12. The method of claim 1, wherein the legacy field includes a legacy-short training field (L-STF), a legacy-long training field (L-LTF), a legacy-signal (L-SIG), and a repeated legacy-signal (RL-SIG).

13. The method of claim 1, wherein the control signal field is an Extreme High Efficiency (EHT) SIG, and the PPDU is an EHT-PPDU.

14. The method of claim 1, wherein the plurality of content channels are continuous with each other in frequency, and each of the plurality of content channels has a bandwidth of 20 MHz.

15. A method in a wireless local area network (WLAN) system, the method comprising:

receiving a Physical Protocol Data Unit (PPDU) including at least one Resource Unit (RU), wherein the PPDU includes at least one legacy field, a universal signal field for interpreting the PPDU, a control signal field including allocation information related to the at least one RU, and a data field, wherein the PPDU is transmitted through a plurality of segments including a first segment and a second segment, wherein the data field is transmitted on a plurality of 20 MHz sub-channels, wherein the plurality of 20 MHz subchannels include odd subchannels and even subchannels, wherein the control signal field includes a plurality of content channels, wherein the plurality of content channels include a plurality of first content channels and a plurality of second content channels, wherein at least one channel included in the first segment among the plurality of first content channels includes a first common field, and the first common field includes a first RU allocation subfield for at least one RU included in the first segment among the odd subchannels and a second RU allocation subfield for at least one RU included in the second segment among the odd subchannels, wherein at least one channel included in the first segment among the plurality of second content channels includes a second common field, and the second common field includes a third RU allocation subfield for at least one RU included in the first segment among the even subchannels and a fourth RU allocation subfield for at least one RU included in the second segment among the even subchannels, wherein the second RU allocation subfield and the fourth RU allocation subfield are set to a preset value for a zero user, wherein at least one channel included in the second segment among the plurality of first content channels includes a third common field, wherein the third common field includes a fifth RU allocation subfield for at least one RU included in the first segment among the odd subchannels and sixth RU allocation subfield for at least one RU included in the second segment among the odd subchannels, wherein at least one channel included in the second segment among the plurality of second content channels includes a fourth common field, wherein the fourth common field includes a seventh RU allocation subfield for at least one RU included in the first segment among the even subchannels and eighth RU allocation subfield for at least one RU included in the second segment among the even subchannels, wherein the fifth RU allocation subfield and the seventh RU allocation subfield are set to a preset value for a zero user; and decoding, based on the universal signal field and the control signal field, the PPDU.

16. An apparatus in a wireless local area network (WLAN) system, the apparatus comprising:

a memory; and a processor operatively connected to the memory, wherein the processor is configured to:

obtain a Physical Protocol Data Unit (PPDU) including at least one Resource Unit (RU), wherein the PPDU includes at least one legacy field, a universal signal field for interpreting the PPDU, a control signal field including allocation information related to the at least one RU, and a data field, wherein the PPDU is transmitted through a plurality of segments including a first segment and a second segment, wherein the data field is transmitted on a plurality of 20 MHz sub-channels, wherein the plurality of 20 MHz subchannels include odd subchannels and even subchannels, wherein the control signal field includes a plurality of content channels, wherein the plurality of content channels include a plurality of first content channels and a plurality of second content channels, wherein at least one channel included in the first segment among the plurality of first content channels includes a first common field, and the first common field includes a first RU allocation subfield for at least one RU included in the first segment among the odd subchannels and a second RU allocation subfield for at least one RU included in the second segment among the odd subchannels, wherein at least one channel included in the first segment among the plurality of second content channels includes a second common field, and the second common field includes a third RU allocation subfield for at least one RU included in the first segment among the even subchannels and a fourth RU allocation subfield for at least one RU included in the second segment among the even subchannels, wherein the second RU allocation subfield and the fourth RU allocation subfield are set to a preset value for a zero user, wherein at least one channel included in the second segment among the plurality of first content channels includes a third common field, wherein the third common field includes a fifth RU allocation subfield for at least one RU included in the first segment among the odd subchannels and sixth RU allocation subfield for at least one RU included in the second segment among the odd subchannels, wherein at least one channel included in the second segment among the plurality of second content channels includes a fourth common field, wherein the fourth common field includes a seventh RU allocation subfield for at least one RU included in the first segment among the even subchannels and eighth RU allocation subfield for at least one RU included in the second segment among the even subchannels, wherein the fifth RU allocation subfield and the seventh RU allocation subfield are set to a preset value for a zero user; and decode, based on the universal signal field and the control signal field, the PPDU.

\* \* \* \* \*